United States Patent [19]
Greene et al.

[11] Patent Number: 5,600,763
[45] Date of Patent: Feb. 4, 1997

[54] ERROR-BOUNDED ANTIALIASED RENDERING OF COMPLEX SCENES

[75] Inventors: Edward C. Greene; Michael H. Kass, both of Palo Alto, Calif.

[73] Assignee: Apple Computer, Inc., Cupertino, Calif.

[21] Appl. No.: 279,251

[22] Filed: Jul. 21, 1994

[51] Int. Cl.$^6$ .............................. G06T 15/30; G06T 17/00
[52] U.S. Cl. .......................... 395/120; 395/121; 395/122; 395/131
[58] Field of Search ................................... 395/120, 121, 395/122, 131, 132

[56]  References Cited

U.S. PATENT DOCUMENTS 4,694,404  9/1987  Meagher .................................. 395/121
5,123,084  6/1992  Prevost et al. ...................... 395/121 X

OTHER PUBLICATIONS

Foley et al., "Computer Graphics, principles and practice", second edition, Addison–Wesley Publishing Company, 1990, pp. 550–555, 673–675 and 686–698.
Samet et al., "Hierarchical Data Structures and Algorithms for Computer Graphics", IEEE Computer Graphics and Applications, Jul. 1988, pp. 59–75.

*Primary Examiner*—Mark K. Zimmerman
*Attorney, Agent, or Firm*—Fliesler, Dubb, Meyer & Lovejoy

[57]  ABSTRACT

An antialiased rendering algorithm that guarantees that each pixel of the output image is within a user-specified error tolerance of the filtered underlying continuous image wherein an object-space octree is used to cull hidden geometry rapidly, and a quadtree data structure is used to test visibility through image-space regions. When regions are too complex, quadtree subdivision is employed to simplify the geometry. Subdivision stops when the algorithm can either analytically filter the required region or bound the convolution integral appropriately with interval methods.

14 Claims, 23 Drawing Sheets

ERROR-BOUNDED ANTIALIASED RENDERING OF COMPLEX SCENES

FIELD OF THE INVENTION

The present invention relates generally to the rendering of complex scenes on an output device and, more particularly, to a rendering algorithm which renders very complex scenes on a display without severe aliasing.

BACKGROUND OF THE INVENTION

In general, rendering is a process by which an object may be drawn on a display, printer or other such device. Computer generated imagery, in particular, is a field in which realistic images of an object such as a complex scene are presented on a computer display using a rendering algorithm. An object being rendered typically is created by a designer using a modeling program to create a complex geometric database and then a rendering algorithm is executed to process that database and create the image on the display.

Frequently, complex objects such as a scene of an office having numerous polygons, contain step edges and other high frequency detail which has posed serious aliasing problems for rendering algorithms. These aliasing problems result in computer generated images on a display which have jaggies and other familiar aliasing artifacts. In general, the potential for aliasing arises in computer graphics because the mathematical representations used to describe images, e.g. polygons, contain energy at arbitrarily high spatial frequencies, while the sampled rasters used to display or print images are limited to a finite range of spatial frequencies.

More specifically, let $I(x,y)$ be a vector-valued function that gives the color of each point on an idealized, continuous display screen for the idealized mathematical representation of a computer graphics image. If a raster image is computed by directly sampling $I(x,y)$ at the center of each output pixel, then any spatial frequency content in $I(x,y)$ above half the sampling rate will alias to a lower frequency and cause disturbing visual artifacts. In non-mathematical terms, in complex scenes, numerous primitives may be visible within an individual pixel, and when this occurs, if a pixel is colored according to the color of the primitive which happens to be visible at pixel center, this color is likely to differ greatly from the local average, causing a disturbing visual artifact.

There are three approaches for dealing with the aliasing problem. The first approach is to adjust the number, locations or weights of the samples to attenuate the visible aliased imagery. The second approach is to try to detect aliasing artifacts in the rendered image and remove them by post-processing. The third approach, and the only one capable of guaranteed accuracy, is to compute or approximate the convolution $I(x,y) * f(x,y)$ of the image $I(x,y)$ with a low-pass filter $f(x,y)$ at each output pixel using analytic or other means. Each of these approaches has its own problems.

The first approach i.e., adjusting the number and location of the samples and the filter kernels used to combine them, can substantially reduce the severity of aliasing artifacts. However, this approach provides no guarantees about the quality of the result and can produce unacceptable errors in cases where a large number of primitives are visible within a single pixel. The basic problem is that it is not known in advance what sampling rate will be required for any particular region of the image, and an algorithm that uses a fixed sampling rate would be unable to deal with extremely complex scenes where large numbers of polygons are frequently visible in a single pixel.

The second approach i.e., post-processing, has limited potential because it begins after the sampling process. If geometric primitives are large compared to pixels, then a post process can sometimes effectively infer edges from the sampled image and soften them to attenuate aliasing artifacts. However, if large numbers of primitives are visible within individual pixels, too much information is lost in the sampling process to allow a post process to compute an acceptable reconstruction.

The third approach i.e., convolution before sampling, is the only technique which, in principle, is capable of eliminating aliasing entirely. From a theoretical perspective, if the function $I(x,y)$ is convolved with the appropriate sinc function, it will be low-pass filtered below the Nyquist sampling rate before sampling and no aliasing will occur. From a practical perspective, however, the ideal sinc function generates ringing (Gibbs phenomenon) at step edges, and therefore other filters such as triangular filters, Gaussians, raised cosine filters, Hamming windows, etc. might be used. Nevertheless, whatever filter is chosen, rendering with this approach requires (a) identifying visible geometric primitives affecting each output pixel and (b) filtering them.

Most visible surface algorithms capable of finding all the geometric primitives potentially affecting a single pixel require examining each primitive in the model of the scene. For ordinary purposes with moderately complex models, this is not a serious limitation. For an extremely complex model, such as one having 100 million primitives, however, this poses a major problem. Examining and processing each of the 100 million primitives will take a prohibitively long time on current computers. The only practical way of rendering the model is to use an algorithm which does work roughly proportional to the visible complexity of the scene rather than the size of the entire model. In general, such algorithms are known as "output sensitive".

Prior application Ser. No. 08/100,113, filed Jul. 30, 1993, entitled "Rendering of 3D Scenes on a Display Using Hierarchical Z-Buffer Visibility", by Greene et al., is assigned to the assignee of the present invention, and is incorporated by reference herein in its entirety. This prior application does work roughly proportional to the visible complexity of the scene by employing a Z-Buffer or depth buffer rendering algorithm for visible surface display of a complex 3D scene. In general, a Z-Buffer rendering algorithm uses a frame buffer F which stores color values of a scene for display, and a Z-Buffer, with the same number of entries as the frame buffer, in which a Z or depth value is stored for each pixel. Typically, in rendering a frame F, the Z-Buffer is initialized to the Z-value of the far clipping plane, and the frame buffer is initialized to the background color. Z values stored in the Z-Buffer range between a value representing the front clipping plane and a value representing the far clipping plane. Polygons are scan converted into the frame buffer and during the scan conversion process, if the polygon point being scan converted at (x, y) is nearer to the viewer than is the point whose color and depth are currently stored in the buffers, then the new point's color and depth replace the old values.

In this prior patent application, an algorithm to accelerate the Z-Buffer rendering of complex environments is disclosed. This algorithm employs two data structures which are an object-space octree and an image-space depth pyramid. The algorithm accelerates the rendering process by culling hidden geometry very effectively for scenes with high depth complexity. With this Z-Buffer rendering, geometry which is hidden on all point samples can be culled whether or not portions of the geometry are visible in between these samples. However, this type of culling can result in aliasing artifacts resulting from failing to consider portions of the geometry which may be visible in between the samples.

SUMMARY OF THE INVENTION

The present invention is an antialiased rendering algorithm that can guarantee that each pixel of the output image is accurate within a user-specified error tolerance of a filtered underlying continuous image. As in the prior patent application, the antialiased rendering algorithm uses an object-space data structure called an octree to cull hidden geometry rapidly but uses a quadtree data structure to test visibility throughout image-regions. The object-space data structure is used to organize the model primitives in world space. The image-quadtree data structure is used to organize information about potentially visible polygons in each region of the screen. With these two data structures, the antialiasing rendering algorithm culls hidden geometry very quickly and establishes color bounds for each output pixel, resulting in eliminating jaggies and other disturbing visual artifacts.

Specifically, the rendering algorithm of this invention includes organizing the primitives in an octree, rendering the scene by front-to-back subdivision of the octree, and testing each of the nested octree cubes for visibility prior to processing the geometry that a cube contains and, furthermore, using a rendering method that performs recursive subdivision of a quadtree representation of image space to resolve the visibility of primitives.

The invention also includes the concept of applying interval methods in the context of a recursive subdivision rendering algorithm to obtain images where each pixel is guaranteed to be accurate within a user-specified error tolerance.

The result is that very complex scenes on a display are rendered without severe aliasing.

DETAILED DESCRIPTION OF THE DRAWINGS

Figure 1:
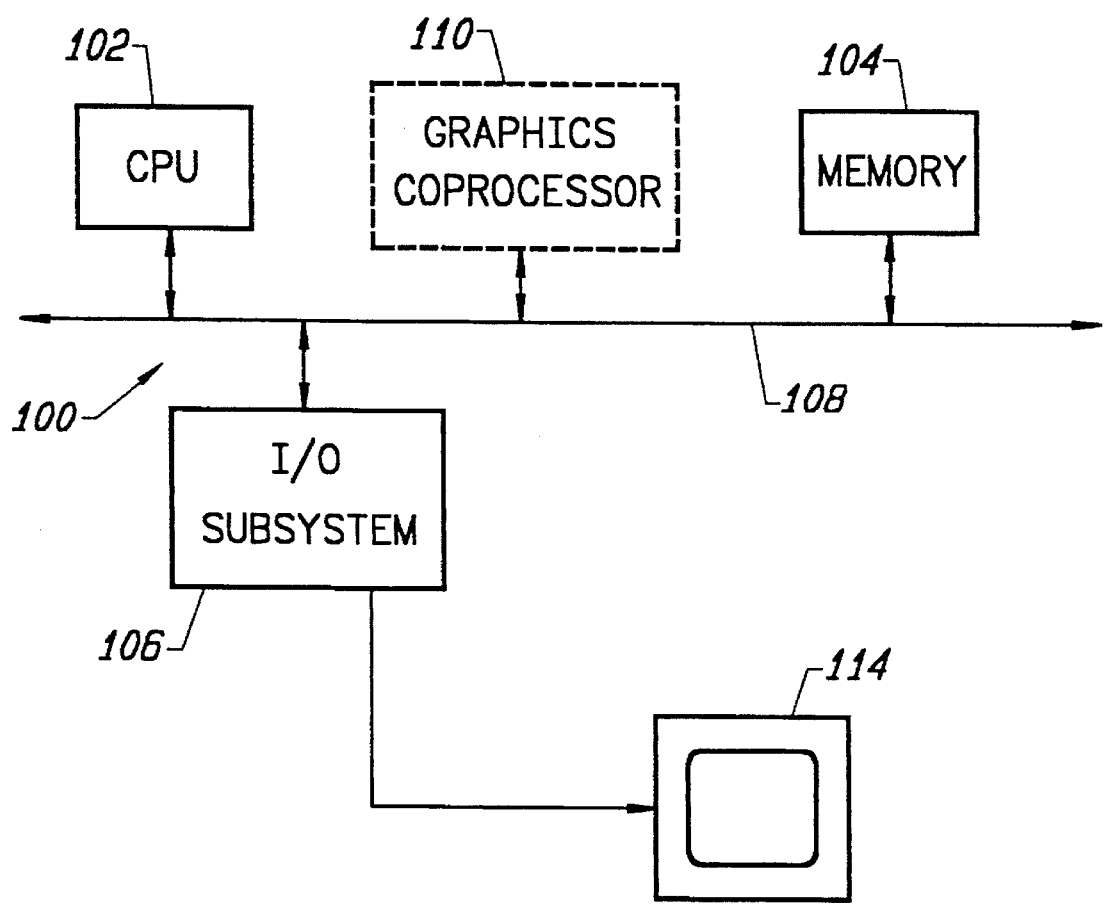
FIG. 1 is a block diagram of a computer system which may be used with the present invention.

FIG. 1 is a block diagram of an example of a computer system 100 which may be used to perform the rendering algorithm and maintain the data structures of the present invention. Although certain types of computer architectures might take better advantage of the invention than others, the invention can be implemented on virtually any type of architecture. In the computer system 100 of FIG. 1, a CPU 102, a memory 104, and an I/O subsystem 106 are all connected to a bus 108. The CPU 102 issues signals over the bus 108 for reading and writing to the memory 104 or to the I/O subsystem 106, in order to manipulate data in the manner described herein. The I/O subsystem 106 may also be capable of issuing signals over the bus 108 in order to access memory 104. The system 100 may also include a graphics coprocessor 110, which can off load from the CPU 102 many of the memory-intensive tasks required for manipulating the graphics data in memory 104. In such situations, a display, illustrated in FIG. 1 as 114, is often driven by the I/O subsystem 106.

Figure 2A:
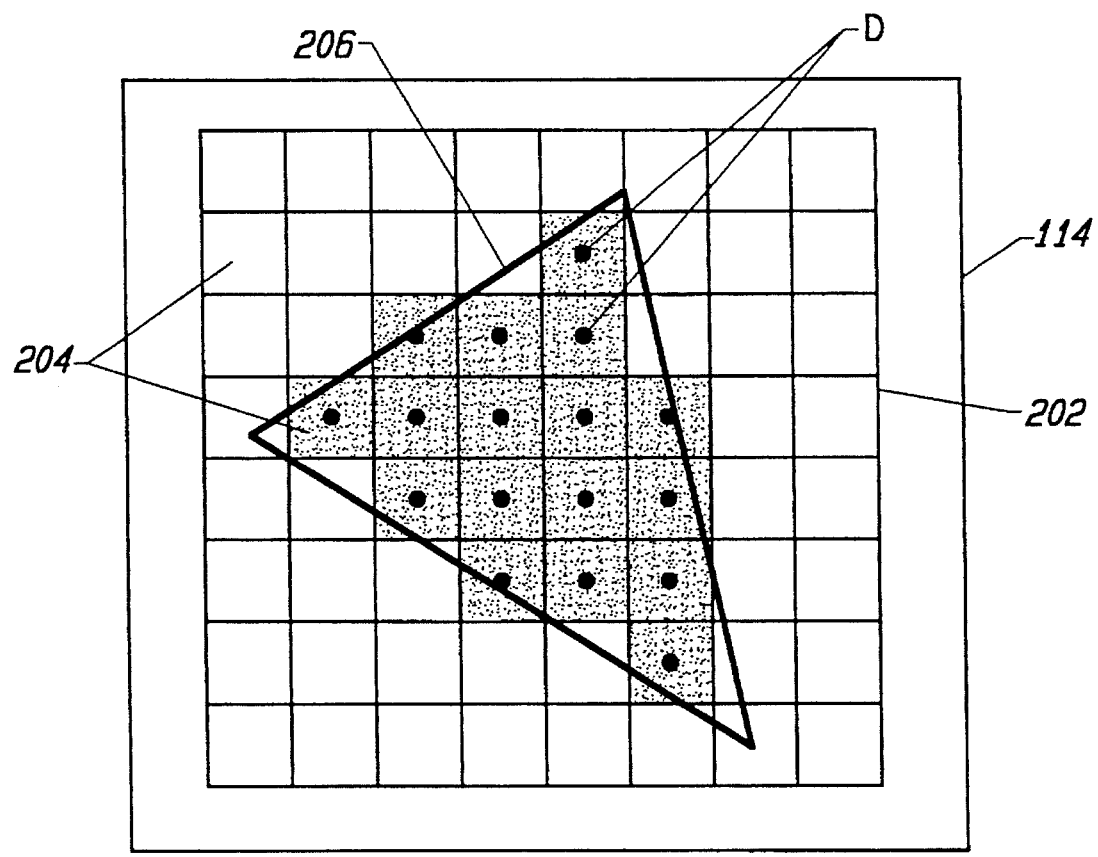
FIG. 2A shows a representation of a triangle on a display which illustrates jaggies.

FIG. 2A is a front view of a typical display 114. It includes a display area 202, which is divided, as a result of the logic circuitry which drives a scanning electron beam, into a plurality of display cells 204. The display cells 204 may be the same as what is commonly known as "pixels". As used herein, the term "display cell" need not be square and, in its most general sense, need not even have the same size or shape on different parts of the display area 202 (although it is preferable if they do).

Shown on the display 114 in FIG. 2A is a surface primitive 206, in particular a triangle represented on an 8×8 raster grid. The surface primitive 206 is represented in memory (for example, memory 104 in FIG. 1) as being in a specific location in a three-dimensional model space, and its appearance on the display 114 represents a projection of the three-dimensional primitive 206 onto the two-dimensional "image-space" of the display area 202. As shown in FIG. 2A, the projection of primitive 206 intersects thirty-two of the sixty-four display cells 204, in that a portion of the surface 206 occupies at least a portion of thirty-two of the display cells 204. As used herein, the surface primitive 206 is therefore considered divided into thirty-two "surface cells", each corresponding to the display cell which it occupies.

Figure 2B:
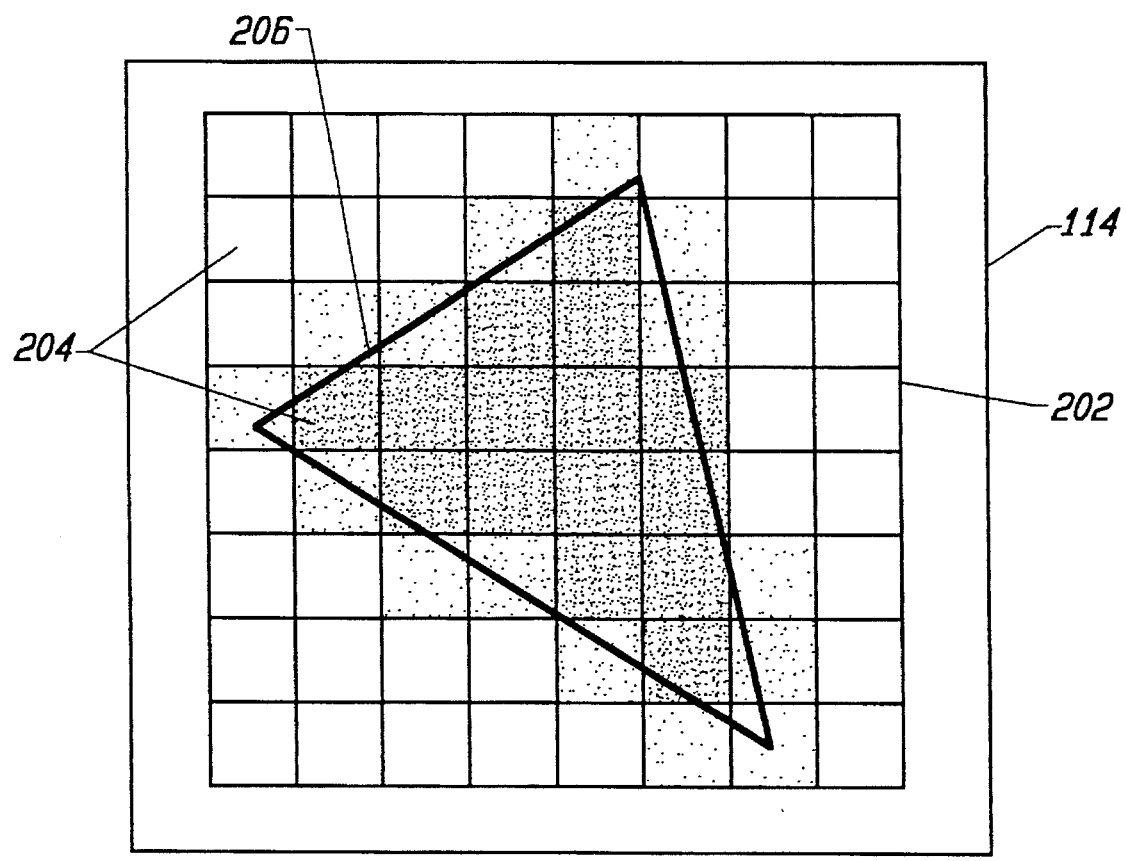
FIG. 2B shows a representation of the triangle on a display using the antialiasing rendering algorithm of the present invention.

FIG. 2A represents the triangle as it might be rendered with a prior rendering algorithm that does not adequately handle, if at all, aliasing artifacts. In particular, the display 114 shows how an algorithm which uses point sampling at the centers D of each pixel causes "jaggies" J. FIG. 2B, on the other hand, schematically illustrates the antialiased tiling of the same triangle rendered on the display 114 using an "area sampling" algorithm. The pixel intensity using area sampling corresponds to the fraction of a pixel that the triangle covers. Thus, this area sampling softens edges relative to the point sampling of FIG. 2A, thereby minimizing visual jaggies.

Figure 2C:
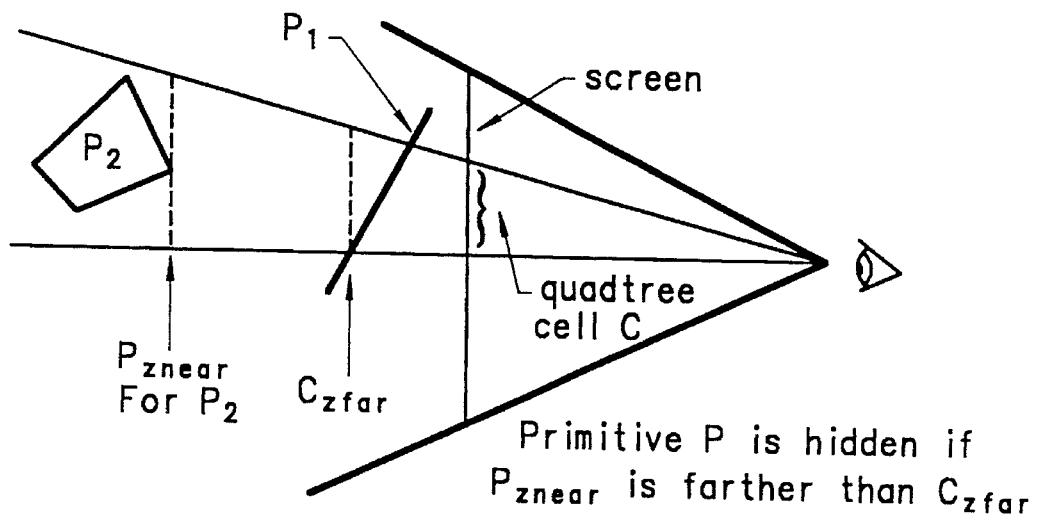
FIG. 2C is a side view of a display screen and primitives used to explain certain depth aspects of the present invention.
Figure 2D:
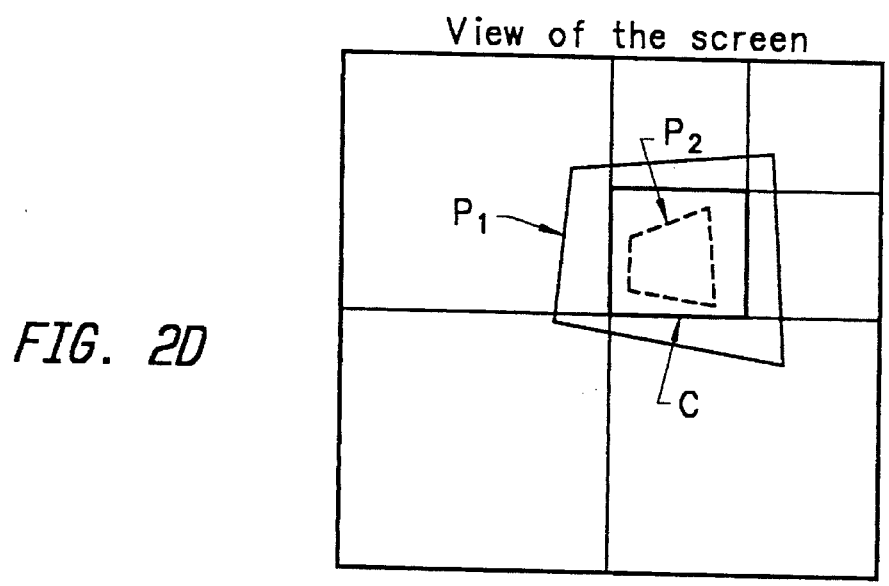
FIG. 2D is a front view of the display screen and primitives as shown in FIG. 2C.

FIG. 2C illustrates a side view of two primitives $P_1$ and $P_2$ in relation to the display screen 114 and a viewpoint VP to explain the concept of "farther" and "nearer" as used herein, while FIG. 2D shows the same scene at the front of the display screen. These figures show the front of the display 114 having several display cells 204, and, in particular, a given quadtree cell C (a quadtree is explained with respect to FIGS. 5A and 5B) as viewed from the viewpoint VP. There is shown a previously rendered occluding object $P_1$ having a farthest depth $C_{zfar}$ within cell C and the object $P_2$ under consideration for the given quadtree cell C having a nearest depth $P_{znear}$ within cell C. As will be described more fully below, in this example, since the nearest depth of the object $P_2$ under consideration is farther from the viewpoint VP than the farthest depth of the previously rendered occluding object $P_1$ for the cell 204 under consideration, this object $P_2$ is hidden and will be culled by the rendering algorithm for display purposes.

Figure 2E:
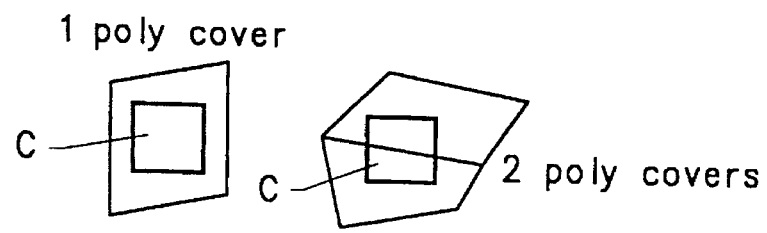
FIG. 2E shows two examples of a given quadtree cell and one or more polygons used to explain the present invention.

In general, the method of establishing occlusion of a primitive hidden within a cell is shown in the two examples of FIG. 2E. First, the method establishes that a quadtree cell C, is completely "covered" e.g., either by a single polygon or by two polygons as illustrated, to obtain a value $C_{zfar}$ for the cell C. With value $C_{zfar}$ then established for this cell C, primitives can then be proven as being hidden within the cell C, such as $P_2$ shown in FIG. 2C.

Figure 3:
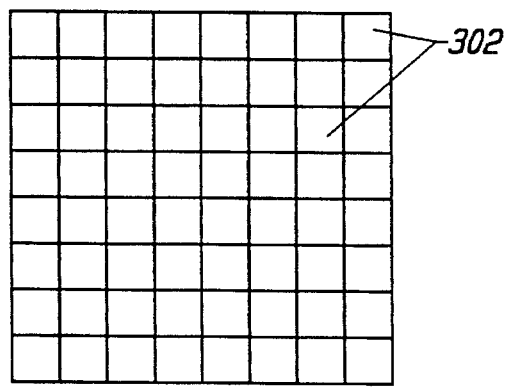
FIG. 3 illustrates a display or frame buffer for the display of FIG. 2B.

FIG. 3 shows a display or frame buffer 300 for the display 114. As mentioned, the display buffer can be in memory 104 (FIG. 1), or in another display driver. It comprises various memory elements 302, one corresponding to each of the display cells 204. Each "display cell element" contains a "display cell value" which represents an attribute of the appearance of the respective display cell on the display 114, such as color.

Figure 4:
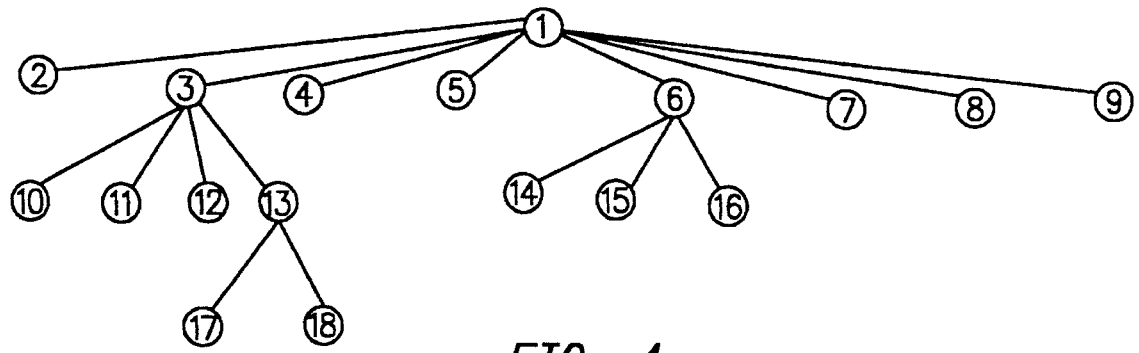
FIG. 4 is an abstract illustration of an octree data structure used with the present invention.

As mentioned above, an aspect of the invention involves associating primitives with nodes of an octree. Each node of the octree represents a cubical section of an overall enclosing model space, defined by a recursive subdivision of that model space. FIG. 4 shows an octree as it might be represented in a computer memory, such as memory 104. As can be seen, it is made up of a plurality of nodes beginning with a root node #1. The spatial cube corresponding to node #1 is the entire overall model space within which all of the primitives reside. Node #1 has eight "child nodes" 2–9, each of which corresponds to a respective cubic octant of the cube corresponding to the parent node #1.

Node #3 of the octree of FIG. 4 itself has four children, namely nodes 10–13. Node #6 has three children, 14–16. Nodes 10–13 are considered "children" of their "parent" node #3, and they are also considered "descendants" of both their "parent" node #3 and "grandparent" node #1. Similarly, nodes 14–16 are children of their parent node #6 and descendants of both their parent node #6 and their grandparent node #1. Nodes 10–13 correspond to four respective ones of the possible eight octants of the cube corresponding to node #3, and nodes 14–16 correspond to three respective ones of the eight octant cubes of the cube corresponding to their parent node #6. Node #13 also has two children, 17 and 18, each corresponding to a respective octant cube of the cube corresponding to node #13. Nodes 2, 4, 5, 7–12 and 14–18 are considered "leaf nodes" since they have no children.

The following is a C-language type definition which may be used to implement the octree of FIG. 4.:

```
/* data structure for an octree_node */
struct octree_node {
    int NP; /* no. of polygons associated with this node and its children */
    int np; /* no. of polygons associated with this node */
    int *poly_ids; /* polygons associated with this node - list of id numbers */
    unsigned char level; /* level in octree */
    short x,y,z; /* cube coordinate */
    float min[3],max[3]; /* 3D min/max box of node */
    struct octree_node *pc[8]; /* pointers to child nodes */
    char is_leaf; /* is node a leaf node? (TRUE/FALSE) */
};
```

Figure 5A:
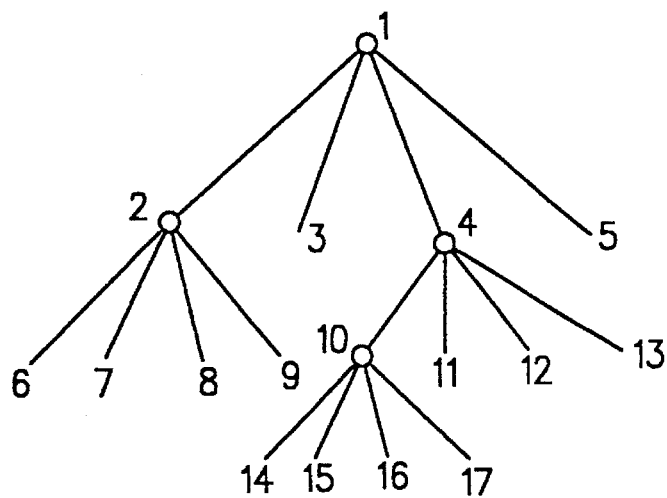
FIG. 5A is an abstract illustration of an image-quadtree data structure used with the present invention.

Similarly, FIG. 5A is an abstract illustration of a quadtree, in particular a simple tree diagram like that of the octree of FIG. 4. The quadtree shown has a root node #1 having four child nodes #2–5. Child nodes #2 and 4 each have four nodes #6–9 and #10–13, while node #10 has four leaf nodes #14–17. Nodes 3, 5, 6–9 and 11–13 also are leaf nodes.

Figure 5B:
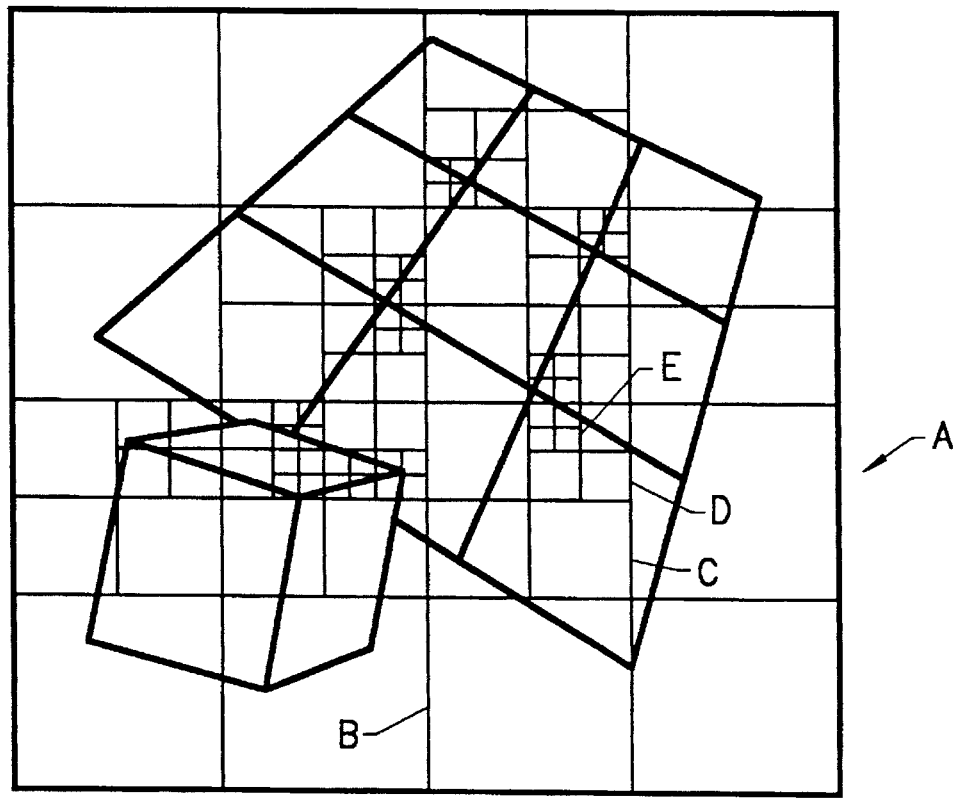
FIG. 5B is an illustration used to explain quadtree subdivision of an image plane which the algorithm of the present invention may perform.

FIG. 5B is used to illustrate quadtree subdivision of an image plane driven by the complexity of visible geometry, which is similar to the subdivision performed by the antialiased rendering algorithm of the present invention described below during a "tiling pass." As illustrated, the example shows 5 levels of subdivisions A–E, i.e., until no more than two primitives are visible in a quadtree cell Q. In the "tiling pass" of the algorithm of the present invention, the quadtree cells are subdivided whenever more than some fixed number of primitives, e.g. 10, are determined to be visible.

Figure 6:
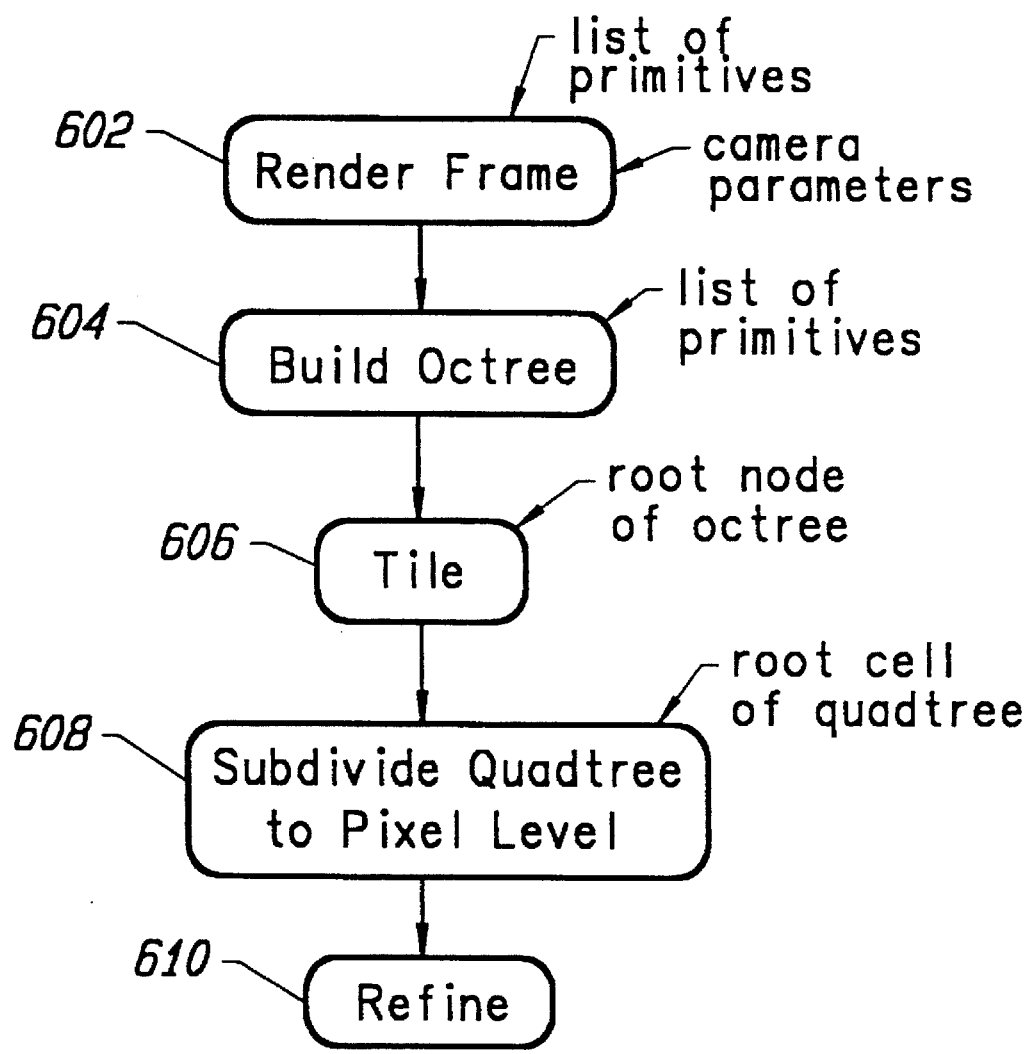
FIGS. 6–19 are flow charts of procedures which may be used to implement the present invention.

FIG. 6 is a flow chart of the overall procedure of the antialiasing rendering algorithm of the present invention.

The procedure 602 RENDER FRAME renders a given frame from an initial list of primitives that has been previously generated and stored in, for example, memory 104, together with initial camera parameters. Camera parameters include information such as the camera viewpoint, direction and orientation, and view angle, as indicated by the viewpoint VP of FIG. 2C.

Figure 7:
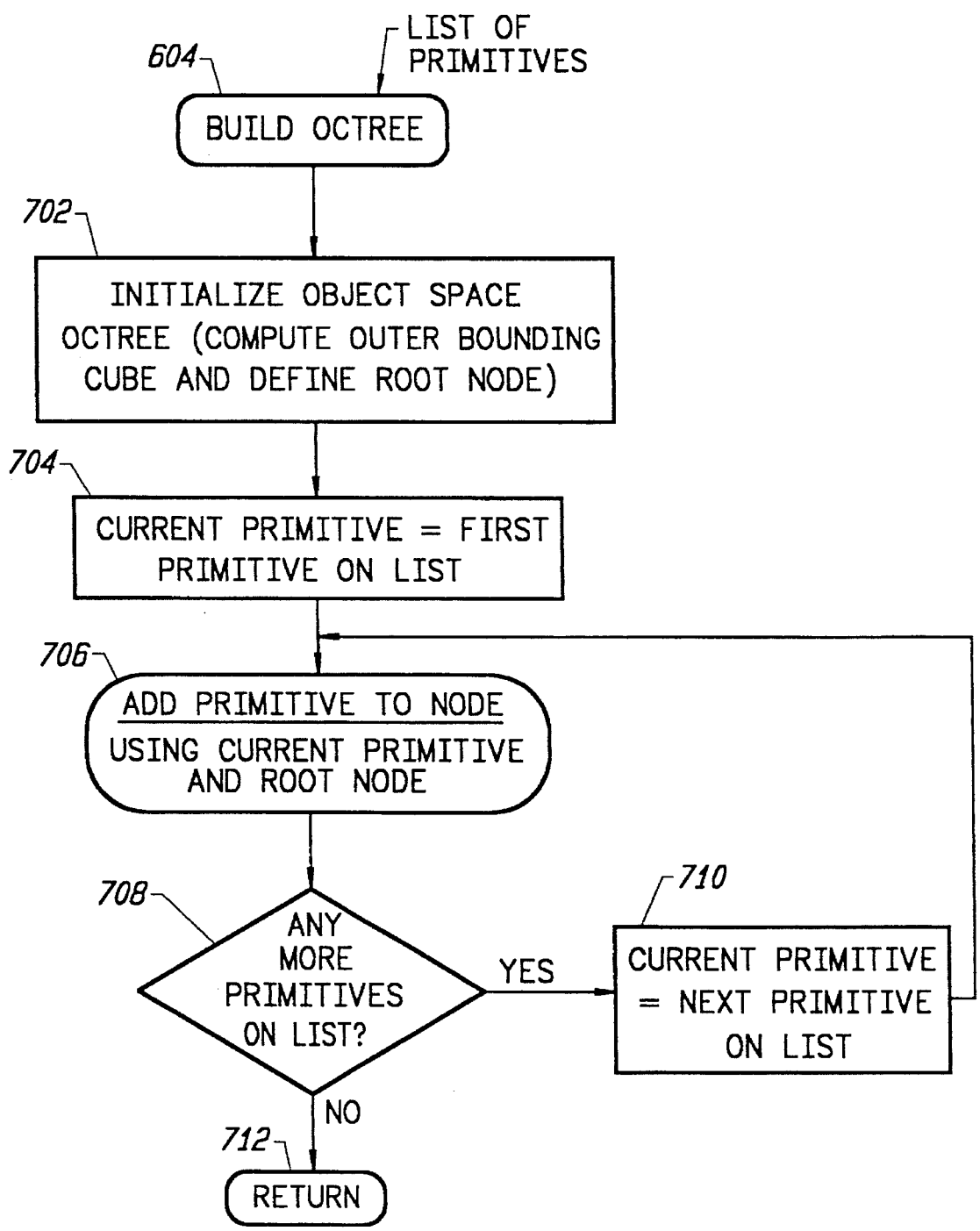
Figure 17:
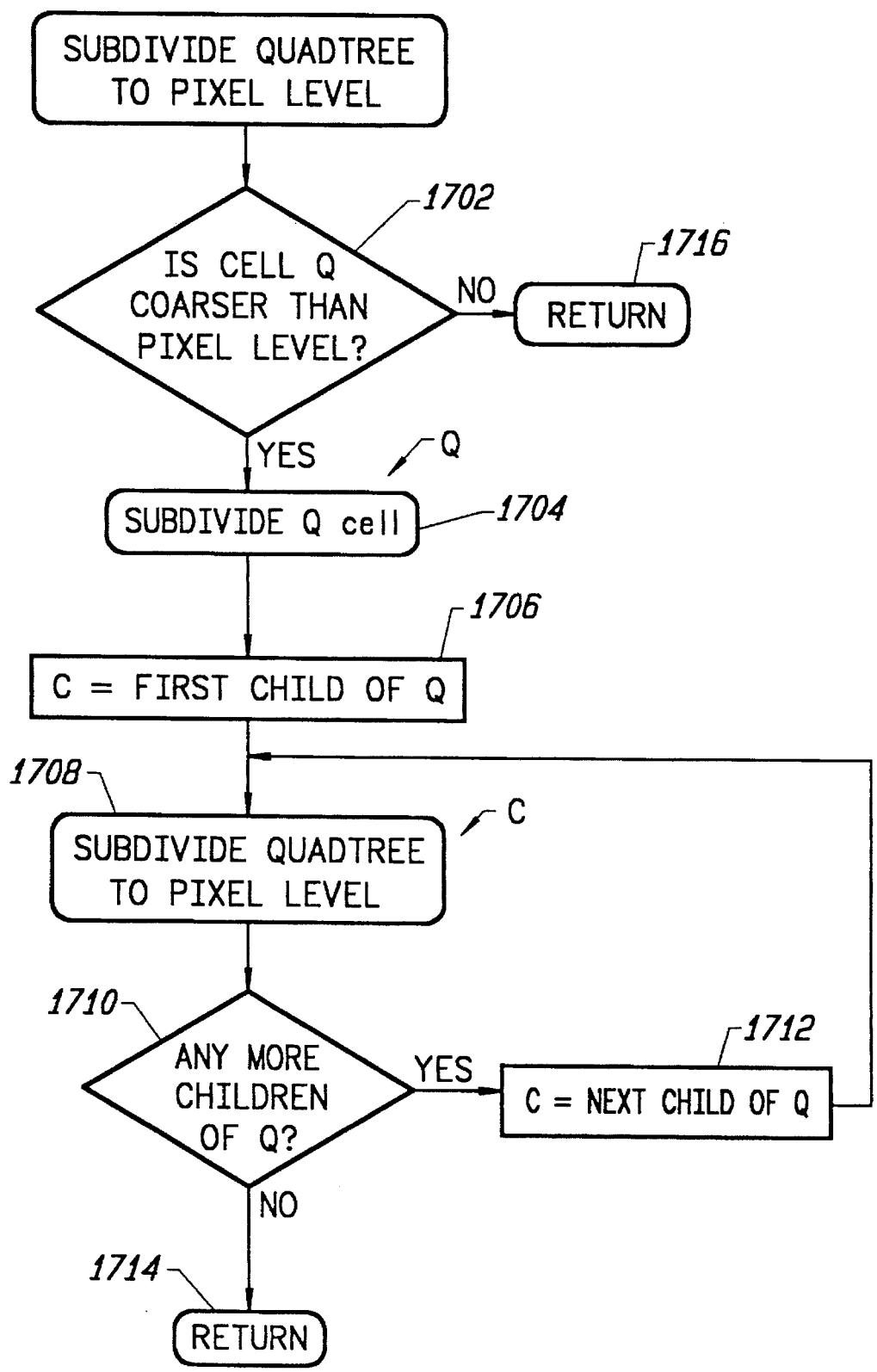

With reference to FIG. 6, in a step 604 BUILD OCTREE, using the list of primitives, an octree data structure is built as shown in FIG. 7. Then, using the root node of the octree, a tiling pass is performed in a step 606 TILE shown in FIG. 9, which will cull hidden polygons and insert the remaining polygons into a quadtree. Then, using the root cell of a quadtree data structure, the quadtree is subdivided to the pixel level in a step 608 SUBDIVIDE QUADTREE TO PIXEL LEVEL as indicated in FIG. 5B and FIG. 17. The step 608 subdivides the quadtree, if necessary, so that all leaf cells are no larger than a single pixel.

Figure 18:
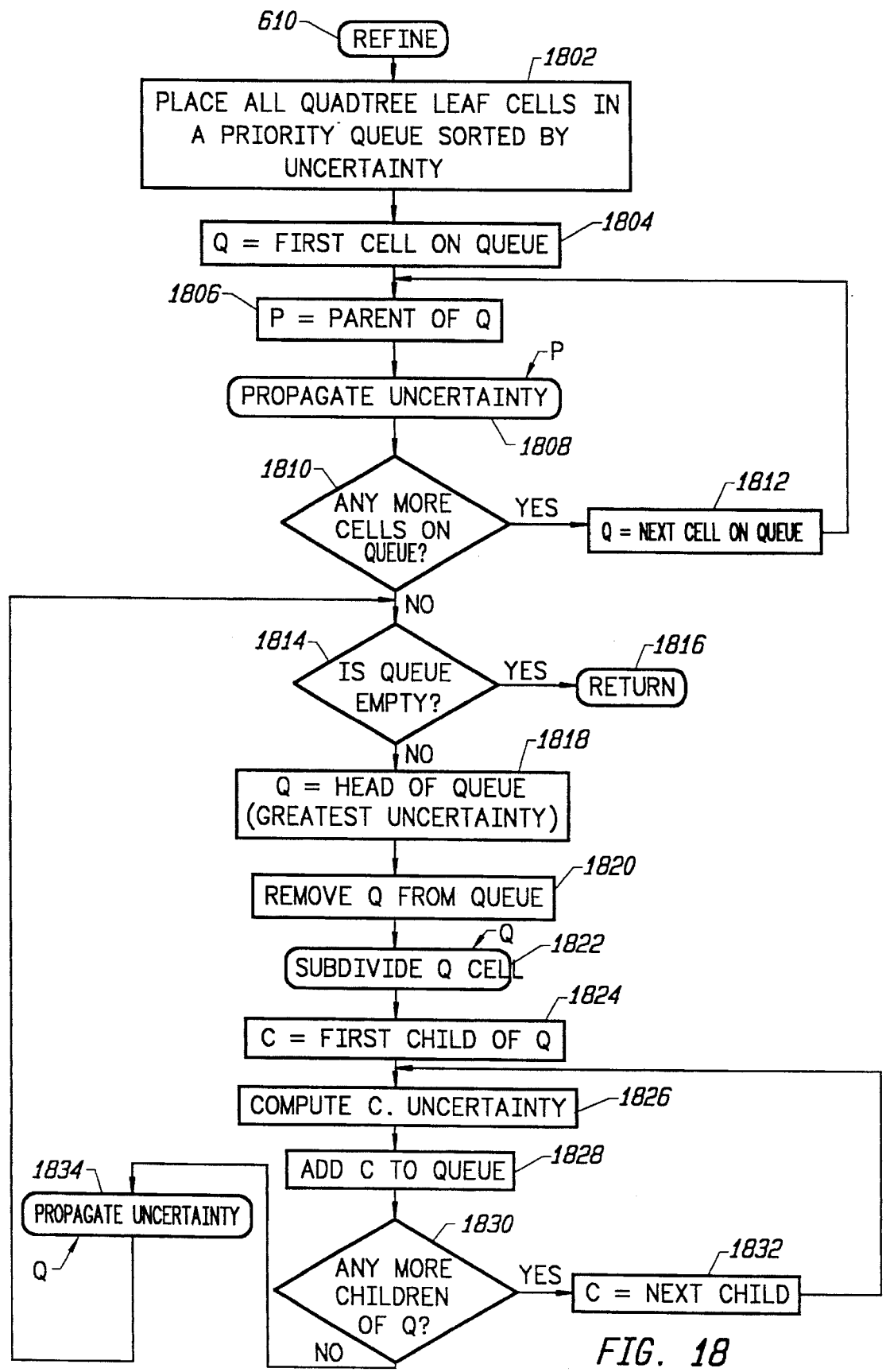

Finally, in a step 610 REFINE, a refinement pass is made as shown in FIG. 18. The refinement pass begins after the tiling pass has culled most of the hidden polygons and inserted the remaining polygons into the quadtree. Its task is to evaluate the filtered color f(x, y) * I(x,y) of each output pixel. If the geometry and shading in a quadtree cell are simple enough, the algorithm may be able to compute the required convolution integral exactly or bound it tightly enough to meet the error tolerance. If the geometry or shading is too complex, the quadtree cell is subdivided using a subdivision algorithm such as the one known as Warnock's algorithm. J. Warnock, "A Hidden Surface Algorithm For Computer Generated Halftone Pictures", Computer Science Dept., University of Utah, TR 4–15, June 1969. New color bounds are computed for the children and propagated to coarser levels of the quadtree. Subdivision continues recursively in breadth-first order until the error tolerance is met at the pixel level. The algorithm converges as long as repeated subdivision ultimately improves the error bounds.

For the purposes of refinement, each quadtree cell is associated with a minimum and maximum bound on each color component of the portion of the convolution integral $f(x,y) * I(x,y)$ within the cell. If the point-spread function $f(x,y)$ is a pixel-sized box filter, then $f(x,y)$, $I(x,y)$ is just the average value of $I(x,y)$ in each pixel and the filtering is known as area sampling. In this case the refinement pass is relatively simple and is described by the flow chart REFINE of FIG. 18.

If the point-spread function $f(x,y)$ of the filter extends beyond the boundaries of a pixel, then the algorithm is somewhat more complicated. In general, if $f(x,y)$ is zero beyond some fixed radius, there will be a small maximum number of pixels k that can be affected by the value of $I(x,y)$ in a pixel or sub-pixel region. In this case, with each quadtree cell, up to k min and max color bounds corresponding to the portion of the convolution integral $f(x,y) * I(x,y)$ lying inside the quadtree cell for each of the affected pixels are stored. Whenever a quadtree cell is subdivided, for each of the affected pixels, a new bounds on $f(x,y) * I(x, y)$ in the children is computed and the changes propagated to the affected pixel-sized quadtree cells. If the point-spread function $f(x,y)$ has negative lobes, the bounds on $f(x,y) * I(x,y)$ can be improved by breaking f into the sum of a positive part $f^+(x,y)$ and a negative part $f^-(x,y)$. Then $f^+(x,y) * I(x,y)$ and $f^-(x,y) * I(x,y)$ separately bound and combined to bound $f(x,y) * I(x,y)$. The control structure for choosing which cell to subdivide next can be the same as outlined above for area sampling.

FIG. 7 illustrates a more detailed flow chart of the step 604 BUILD OCTREE of FIG. 6 for building an octree based on the list of primitives. The object-space octree is first initialized in a step 702. Initialization includes computing the outer bounding cube and defining the root node of the octree. Then, a "current primitive" is set as the first primitive on the list of primitives pursuant to a step 704. Then, in a step 706 (ADD PRIMITIVE TO NODE—see FIG. 8), the current primitive is added to the root node. If another primitive is on the list, as determined pursuant to a step 708, the next primitive on the list is set to the current primitive as shown in a step 710, and the procedure loops to step 706. If there are no more primitives on the list (step 708), then a return is made pursuant to a step 712.

Figure 8:
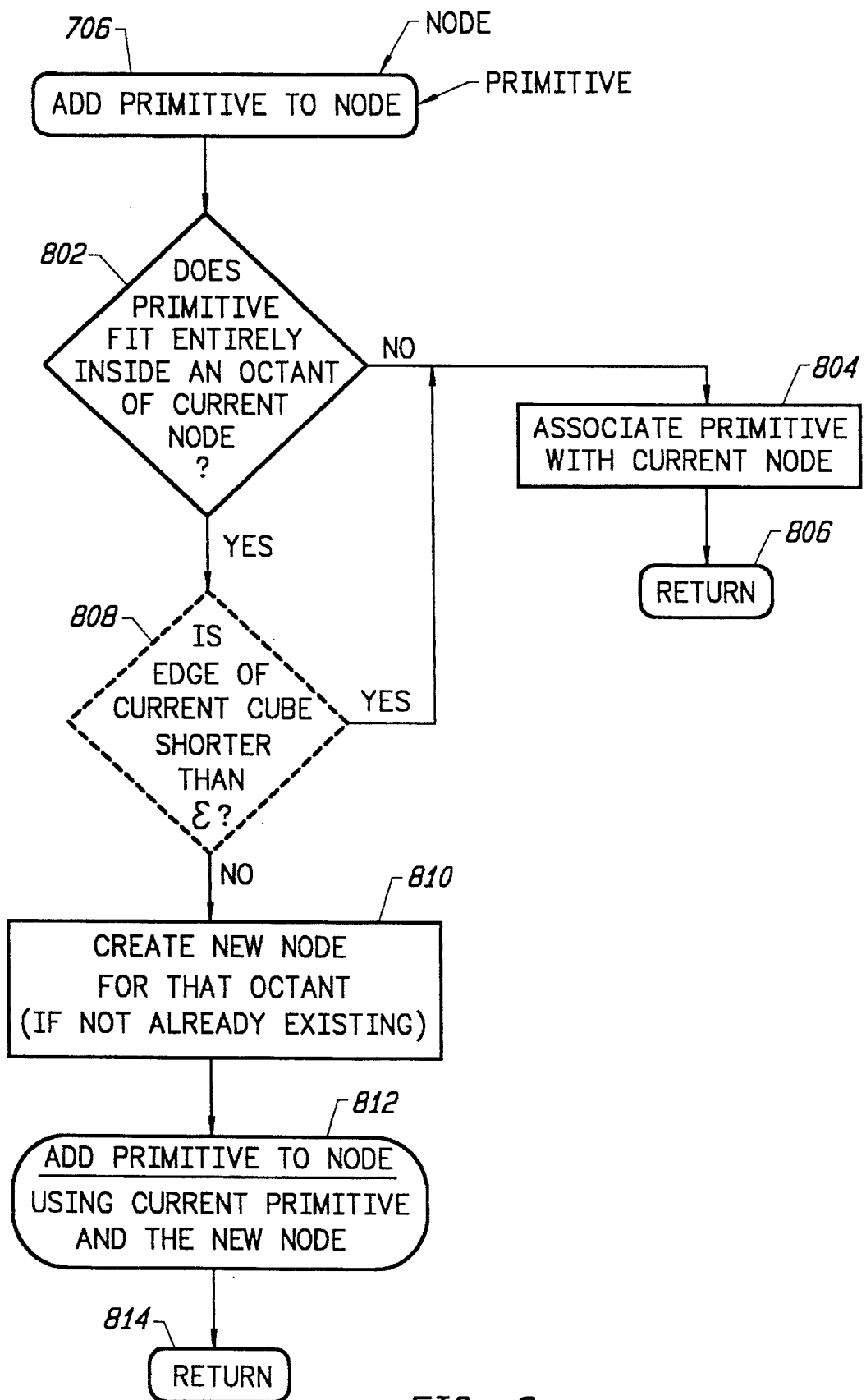

FIG. 8 illustrates in more detail the flow chart for the step 706 ADD PRIMITIVE TO NODE for adding a primitive to a node. This procedure utilizes data of the particular node or cube being processed, such as a given parent or child node, together with the primitive under consideration. First, a step 802 is executed to determine if the primitive fits entirely inside an octant of a current node. If it does not, then the primitive is associated with the current node in a step 804 and then a return is made by a step 806. If the primitive fits entirely inside the octant of a current node (step 802), then a determination is made if the edge of the current node or cube is shorter than a predetermined epsilon value pursuant to a step 808. If the edge is shorter, then the procedure continues to step 804. If the edge is not shorter, then a new node, i.e. a child node, for that octant is created in a step 810. The new node is created only if it is not already existing.

Then, in a step 812, and with respect to the new node that has been created, the procedure 706 ADD PRIMITIVE TO NODE is again performed with a return then being made by a step 814 after adding the last primitive on the list (step 708 or FIG. 7). Upon the execution of the return step 814, the octree has been built with primitives associated with respective nodes.

Figure 9A:
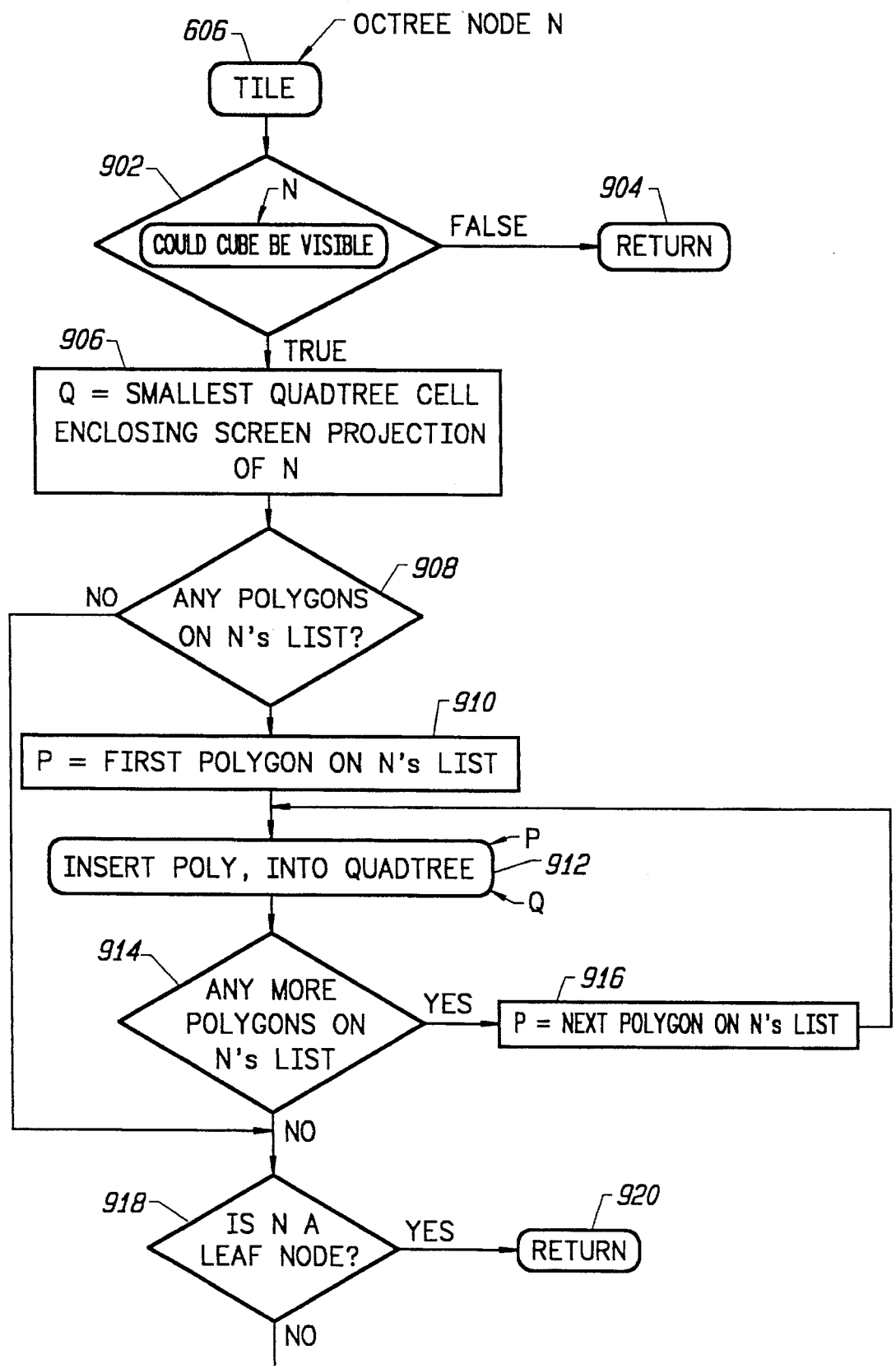
Figure 9B:
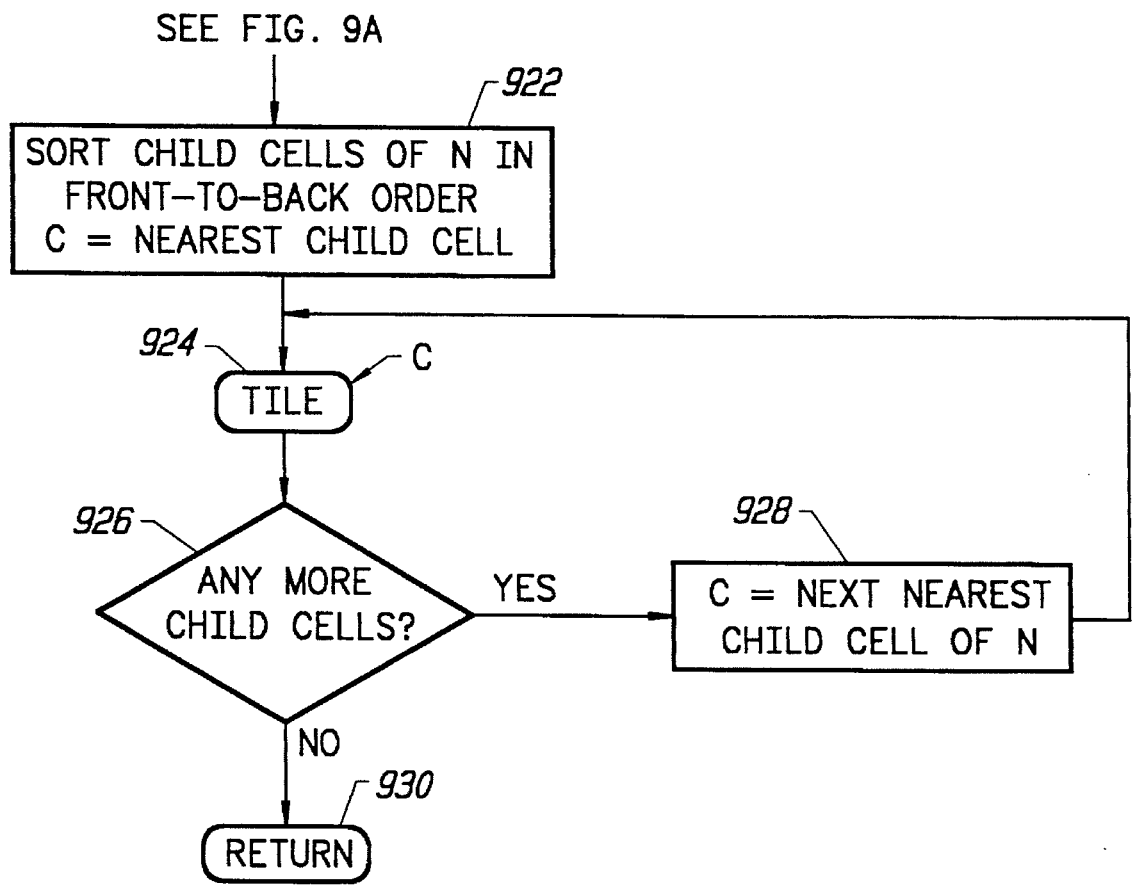

As shown in FIG. 6, after the octree has been built (step 604), the tiling pass is executed (step 606 TILE), which will be described in relation to the more detailed flow chart of FIG. 9. This step 606 utilizes the data structure for an octree node N that has been built.

Initially, a determination is made if the cube of the node N could be visible pursuant to a step 902 COULD CUBE BE VISIBLE. If false, then a return is made as in a step 904. If true, then the smallest quadtree cell Q enclosing the screen projection at the node N is identified in a step 906. Then, at a step 908, a determination is made if there are any polygons on the list for the node N as determined by step 706 ADD PRIMITIVE TO NODE. If yes, then P is set equal to the first polygon on the list of node N in a step 910. Next, using the first polygon P for the smallest quadtree cell Q, this polygon is inserted into the quadtree data structure in a step 912. If there are more polygons on the list for the node N, pursuant to a step 914, then P is set equal to the next polygon on this list in a step 916 and a loop is made to step 912 for its insertion into the quadtree data structure.

Then, if there are no more polygons on N's list (step 914), and pursuant to a step 918, if the node N is a leaf node (meaning there are no further children), then a return is made at a step 920. If the node N being processed is not a leaf node (step 918), then the child cells of the node N are processed in front to back order, beginning with setting a value C equal to the nearest child cell C in accordance with a step 922. Next, with respect to the nearest child cell C a tiling pass again is carried on pursuant to a step 924 rather than with respect to the octree node N at step 606. If there are more child cells as determined in a step 926, then C is set to next nearest child cell of the node N at a step 928 and a loop made to step 924 for another tiling pass. If there are no more child cells (step 926), a return is made at step 930. With reference to step 908, if there are no polygons on the list of the octree node N, a jump is made to step 918 to determine if this node is a leaf node and the procedure continues.

Figure 10:
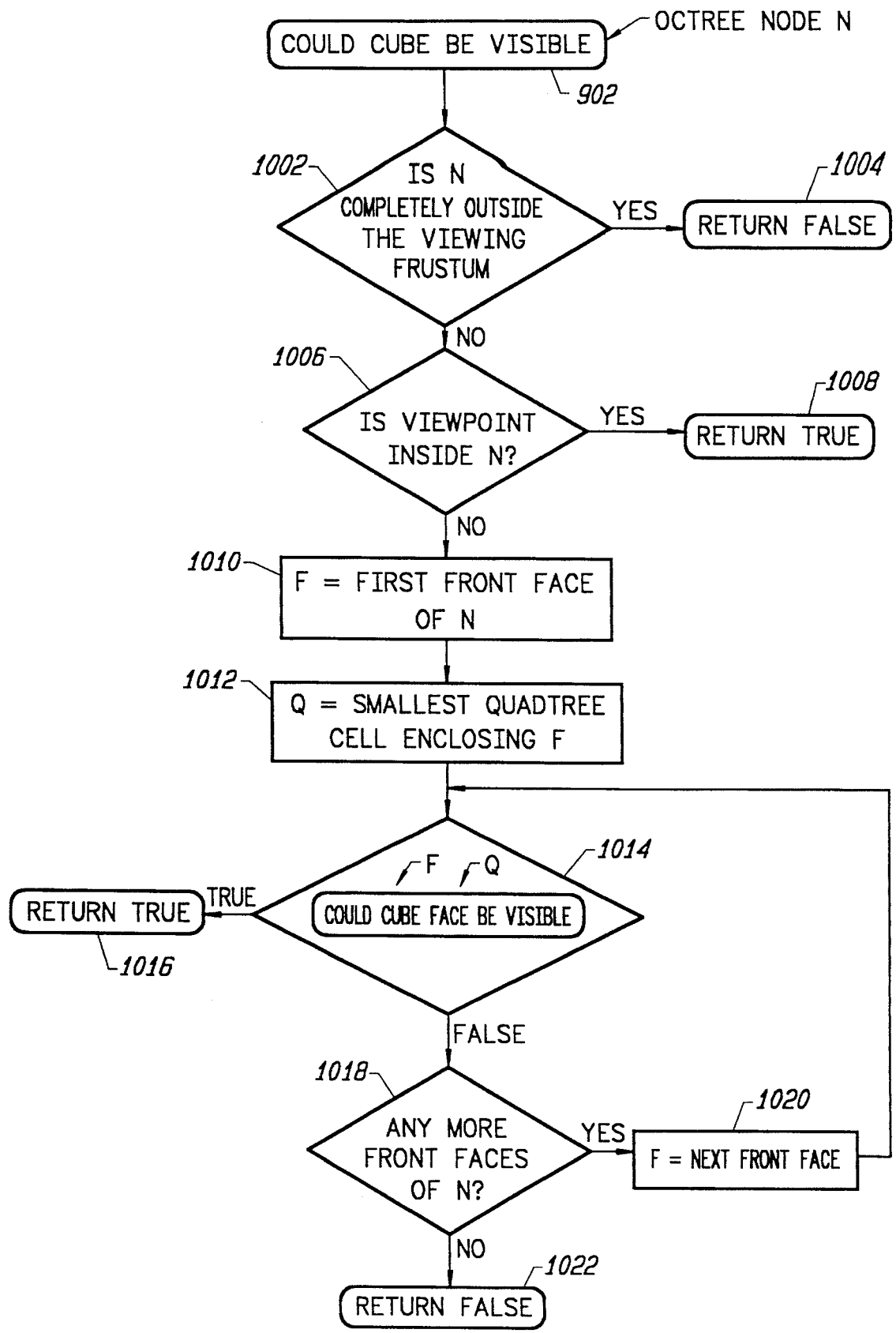

As shown in more detail in FIG. 10, the procedure 902 COULD CUBE BE VISIBLE (step 502 of FIG. 9) for determining if the cube could be visible is performed with respect to an octree node N. In a step 1002, if the node N is completely outside the viewing frustrum of the camera, then a return FALSE is made in accordance with a step 1004, indicating that the cube is not visible and can be culled. If node N is not completely outside of the viewing frustrum, then a determination is made if the viewpoint is inside the node N at a step 1006. If yes, then a return TRUE is made pursuant to a step 1008. If not, then F is set equal to first front face F of the node N in a step 1010 and Q is set equal to the smallest quadtree cell enclosing the first front face F via a step 1012. Then, using the first front face F and the smallest quadtree cell Q, a determination is made as to whether the cube face (as opposed to the entire cube indicated in step 902) is visible pursuant to a step 1014 COULD CUBE FACE BE VISIBLE. If the cube face could be visible, then a return TRUE is made via a step 1016, but if the cube face is not visible, then a step 1018 is executed to determine if any more front faces of the node N being processed exist. If yes, then F is set to the next front face via a step 1020 and a loop made to step 1014. If not, then a return FALSE is made via a step 1022.

Figure 11A:
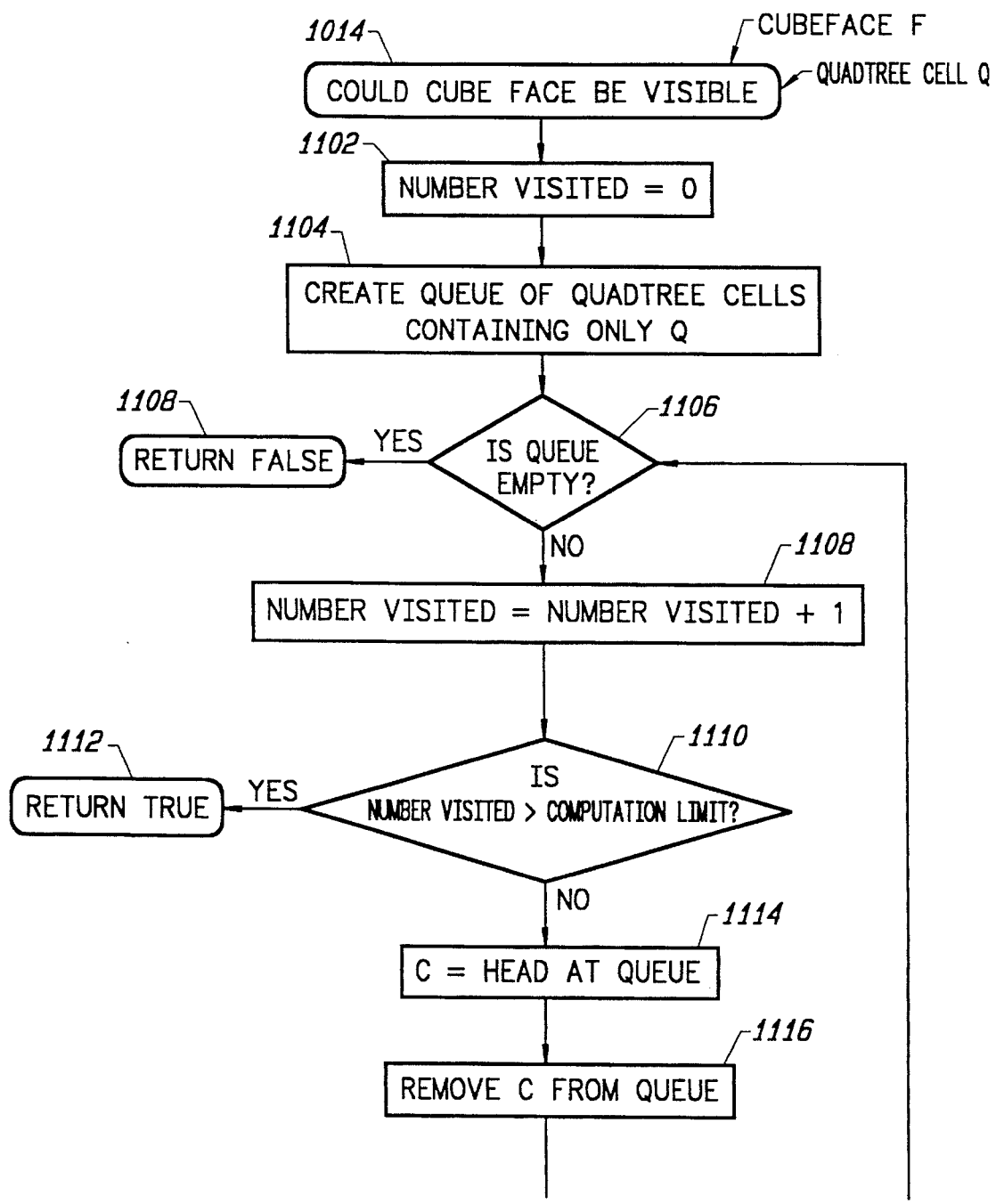
Figure 11B:
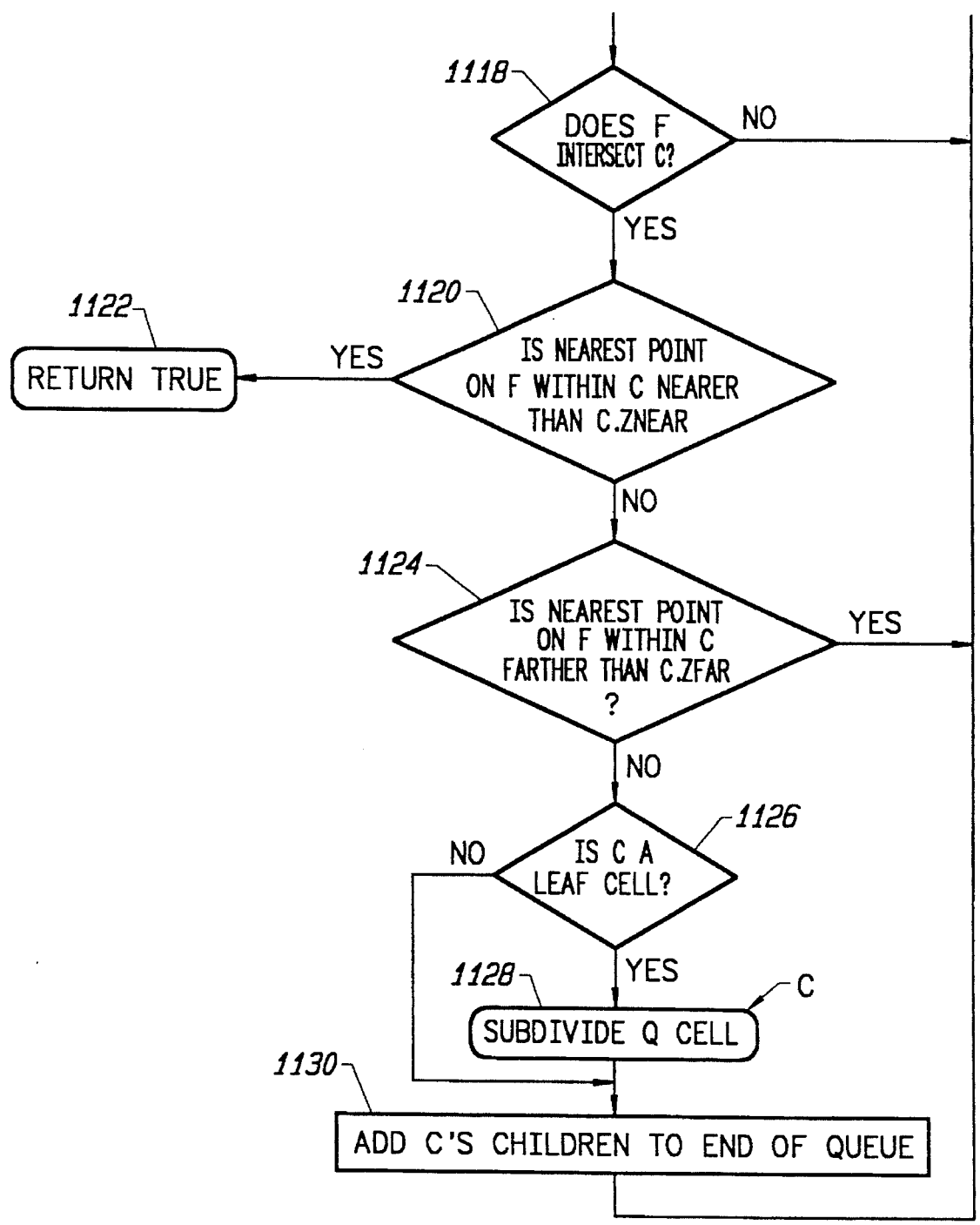

The step 1014 COULD CUBE FACE BE VISIBLE for determining if a cube face F could be visible is illustrated in more detail in FIG. 11. Using cube face F data and quadtree cell Q data, this procedure first sets the number of faces visited equal to zero in a step 1102, and then in a step 1104 creates a queue of quadtree cells containing only the quadtree cell Q. If the queue is empty as determined at a step 1106, a return FALSE at a step 1108 is made. If not, then the number visited is set to the number visited plus 1 at a step 1108. As determined at a step 1110, if this number visited is greater than a certain computational limit, then a return TRUE via a step 1112 is made. If not, a value C is set equal to the quadtree node at the head of the queue at a step 1114 and then C is removed from the queue at a step 1116. With C removed from the queue and being processed, the determination is made at a step 1118 if the cube face F being processed intersects C. If not, a loop is made to step 1106. If yes, then via a step 1120 a determination is made if the nearest point on the face F within C is nearer than the znear of C (see FIG. 2C). If yes, then the cube face F could be visible so that a return TRUE via a step 1122 is made. If not, then a determination is made if the nearest point on the face F within C is farther than the zfar of C in accordance with a step 1124. If yes, then a loop is made to step 1106. If not, then in a step 1126, if C is determined to be a leaf cell, then using this cell a subdivision of the quadtree cell is made via a step 1128 SUBDIVIDE QCELL. The subdividing step 1128 is illustrated in more detail of the flow chart of FIG. 12.

Then, after this subdivision of step 1128, C's children are added to the end of the queue via a step 1130 and a loop made to step 1106. If C is not a leaf cell as determined at step 1126, the procedure jumps to step 1130.

Figure 12:
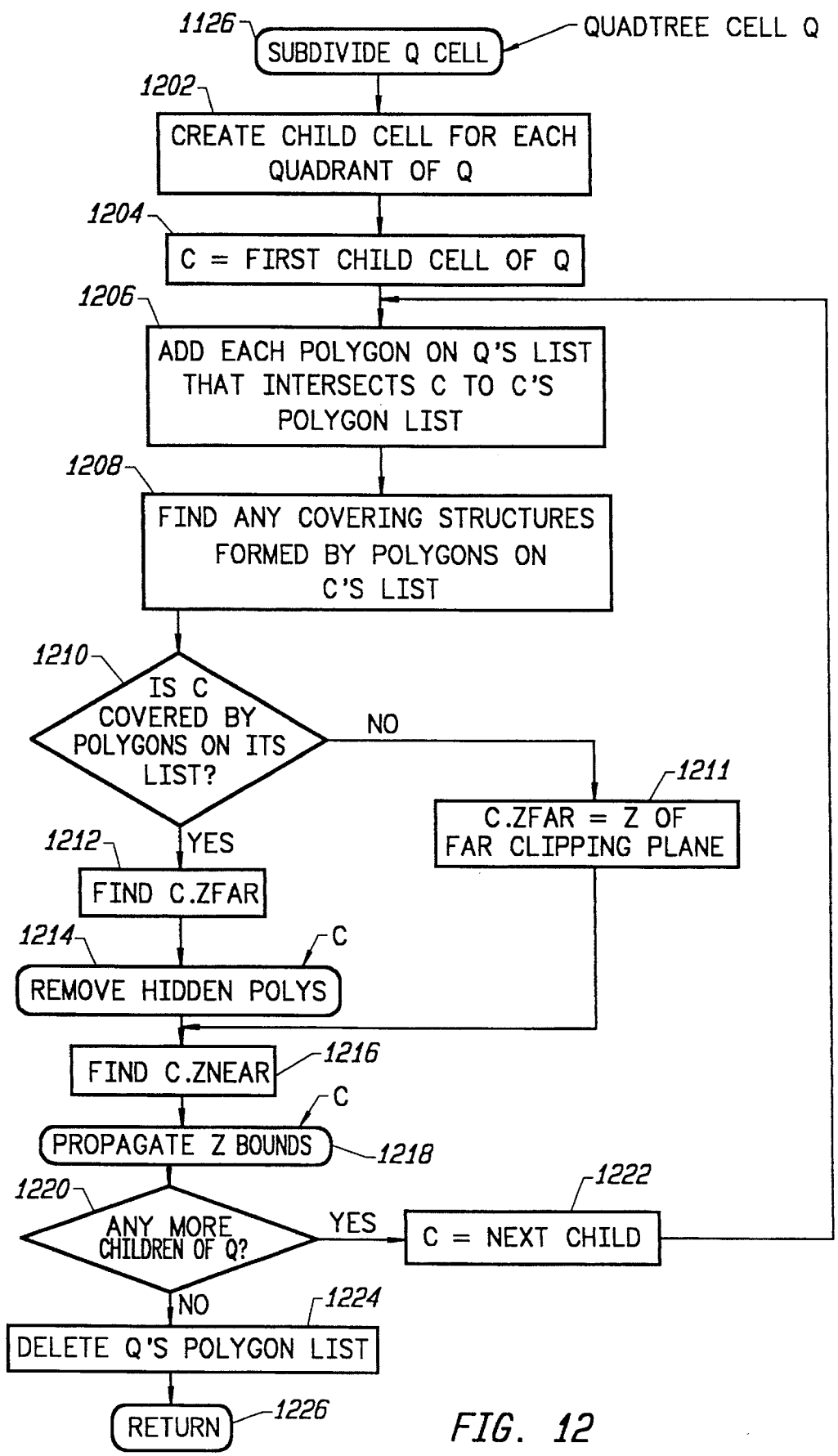

FIG. 12 illustrates in more detail the step 1126 SUBDIVIDE QCELL (quadtree cell) shown in FIG. 11 for subdividing a quadtree cell. Initially, in a step 1202, a child cell C for each quadrant of the quadtree cell Q is created. Then C is set equal to the first child cell of quadtree cell Q in a step 1204. Next, each polygon on the list for the quadtree cell Q that intersects the child cell C is added to the polygon list for C in a step 1206. Next, the procedure finds any covering structures (see FIG. 2E) formed by polygons that are on C's list in a step 1208. If the child cell C being processed is covered by a polygon on its list as determined in a step 1210, then zfar for this cell C is found in a step 1212. Any polygons beyond zfar which are hidden are then removed via a step 1214 REMOVE HIDDEN POLYS described in more detail in relation to FIG. 16.

Then, in a step 1216, the procedure finds znear for the child cell C. Next, using the child cell C, the z bounds are propagated in a step 1218 PROPAGATE Z BOUNDS described more fully in FIG. 13. A determination is then made via a step 1220 if there are any more children of the quadtree cell Q. If there are, then C is set equal to the next child in a step 1222 and the procedure loops to the step 1206. If not, the polygon list of quadtree cell Q is deleted via a step 1224 and a return made by a step 1226. Note with reference to step 1210, that if the child cell is not covered by any polygon on its list, then zfar of C is set equal to z of a far clipping plane in a step 1211 and the program jumps to a step 1216.

Figure 13:
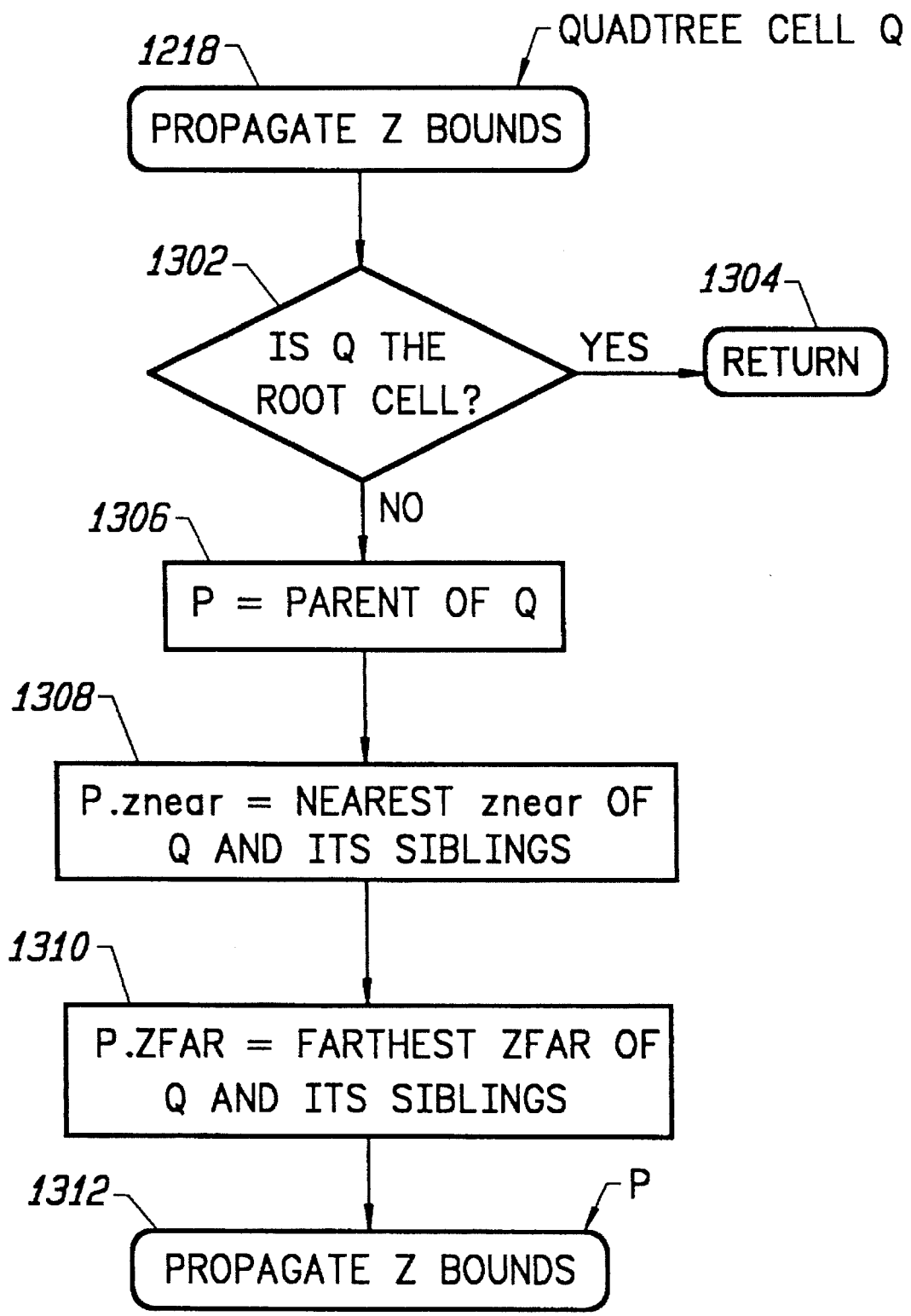

FIG. 13 illustrates the flow chart for propagating the z bounds of the quadtree cell Q being processed in the step 1218 PROPAGATE Z BOUNDS of FIG. 12. The procedure first determines if the quadtree cell Q is the root cell in a step 1302. If it is, then a return is made via a step 1304. If not, then P is set as the parent of the quadtree cell Q in a step 1306. Then, for this parent P, znear is set equal to the nearest znear of the quadtree cell Q and its siblings in a step 1308. Next, zfar for this parent P is set as the farthest zfar of the quadtree cell Q and its siblings in a step 1310. Finally, the z bounds of the parent P are then propagated in a step 1312.

Figure 14A:
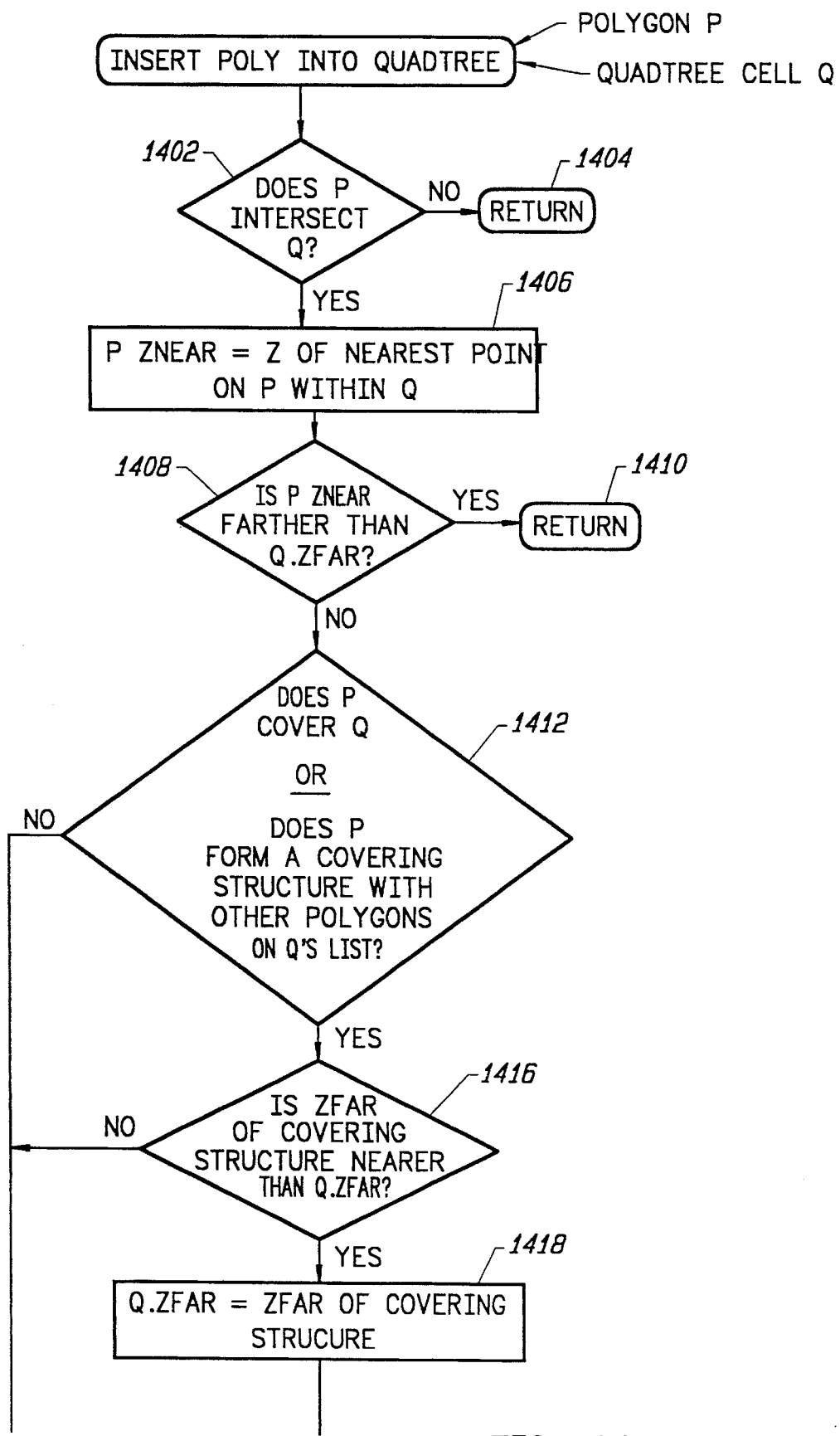
Figure 14B:
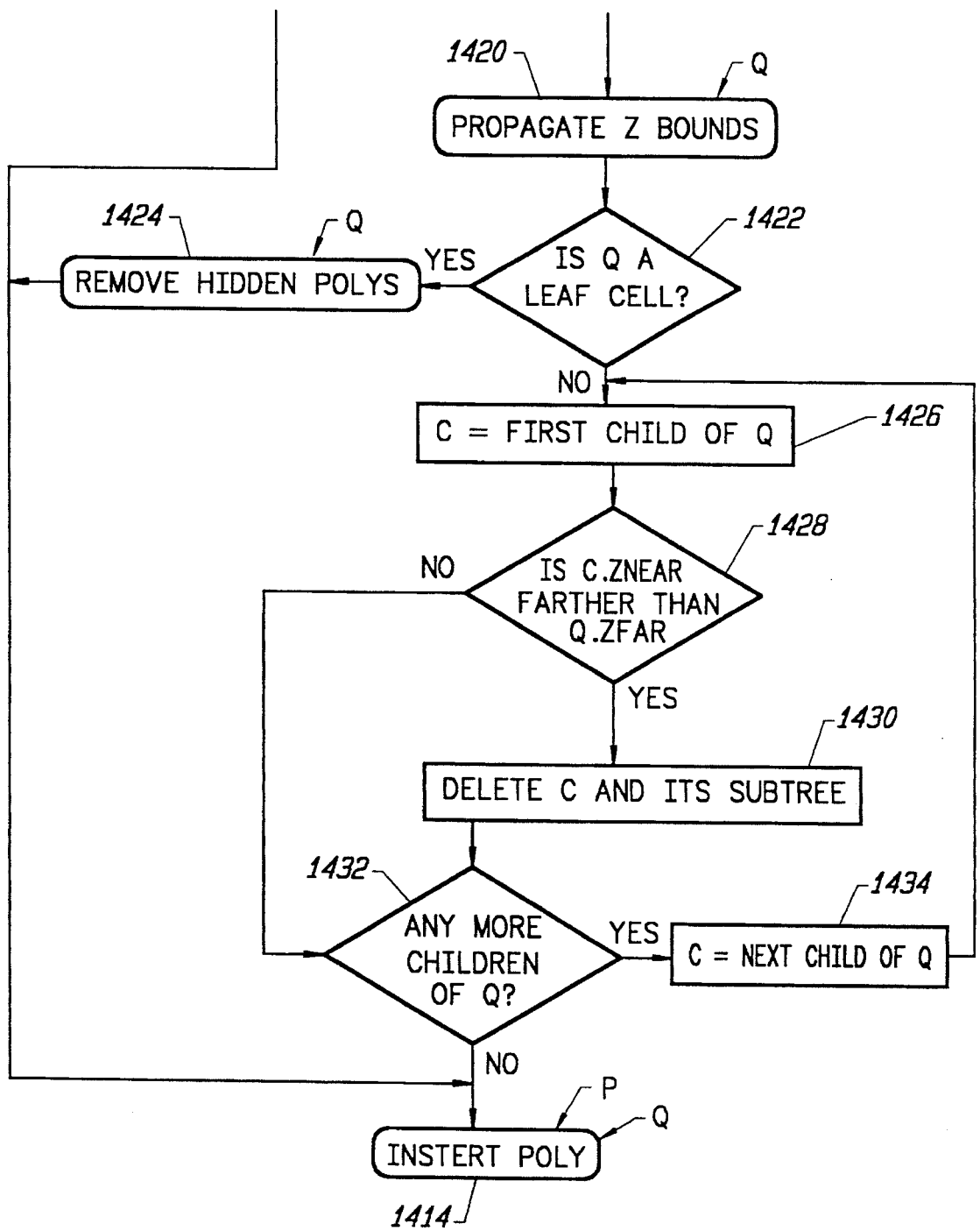

FIG. 14 illustrates in detail the flow chart INSERT POLY INTO QUADTREE for inserting a given polygon P into a particular quadtree cell Q. If the polygon P does not intersect the quadtree cell Q as determined by a step 1402, then a return is made via a step 1404. If there is an intersection, then znear for the polygon is set equal to z of the nearest point of the polygon P within the quadtree cell Q via a step 1406. If znear of the polygon P is determined to be farther than zfar for the quadtree cell Q in a step 1408 then a return is made via a step 1410. If not, then in a step 1412 a determination is made if the polygon P covers the quadtree cell Q or if the polygon P forms a covering structure with other polygons on the list of polygons for the quadtree cell Q being processed. If not, then the procedure jumps to a step 1414 INSERT POLY described in FIG. 15.

If the determination is yes in the step 1412, then in a next step 1416 a determination is made if zfar of the covering structure is nearer than zfar for the quadtree cell Q. If not, then the procedure jumps to step 1414. If yes, then zfar for the quadtree cell Q is set equal to zfar of the covering structure in a step 1418 (i.e., the z value of the farthest visible point on the covering structure within Q.). Next, using the data of the quadtree cell Q being processed, the z bounds are propagated in a step 1420 in the manner shown in FIG. 13.

Next, if the quadtree cell Q is determined to be a leaf cell via a step 1422, then all hidden polygons relative to this leaf cell are removed via a step 1424 and the procedure continues to step 1414. If the quadtree cell Q is not a leaf cell, then C is set equal to the first child of the quadtree cell Q via a step 1426. If the znear of the child cell C is farther than the zfar of the quadtree cell Q as determined in a step 1428, then this child cell and its subtrees are deleted via a step 1430. If znear of the child cell C is not farther than zfar of quadtree cell Q, as determined in the step 1428, then the procedure jumps to step 1432 to determine if any more children of the quadtree cell Q are present. If yes, then C is set equal to the next child of the quadtree cell Q in a step 1434 and a loop made to the step 1426. If not, then the procedure moves to step 1414.

Figure 15:
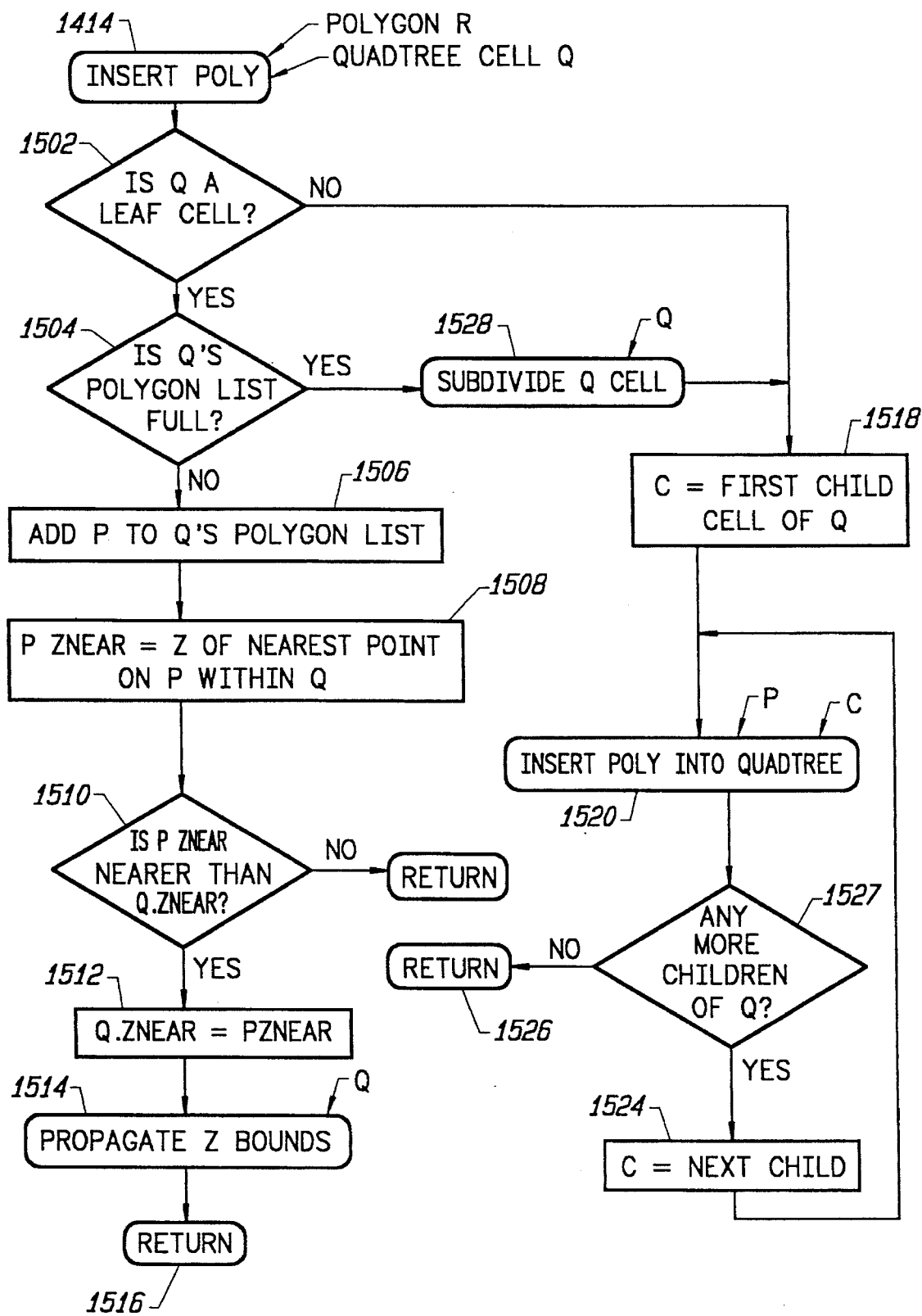

FIG. 15 shows the flow chart INSERT POLY (step 1414 of FIG. 14) for inserting a polygon P into a given quadtree cell Q. If the quadtree cell Q is a leaf cell as determined in a step 1502, and the polygon list of this quadtree cell Q is not full, as determined at a step 1504, then the polygon P is added to the polygon list of the quadtree cell Q at a step 1506. Then, znear for the polygon P is set to the z of the nearest point on the polygon P within the quadtree cell Q by a step 1508. If this znear of the polygon P is nearer than the znear of the quadtree cell Q as determined in a step 1510, then znear of the quadtree cell Q is set equal to znear of the polygon P in a step 1512. Next, the z bounds of the quadtree cell Q are propagated in a step 1514 PROPAGATE Z BOUNDS as shown in FIG. 13 and a return made via a step 1516.

If the quadtree cell Q is not a leaf cell (step 1502), then a branch is performed and C is set equal to the first child cell of the quadtree cell Q at a step 1518. Then, using the polygon P and the child cell C, this polygon is inserted into the quadtree via a step 1520 INSERT POLY INTO QUADTREE using the flow chart of FIG. 14. As determined in a step 1522, if there are more children of the quadtree cell Q, then C is set equal to the next child at a step 1524 and a loop made to the step 1520. If there are no more children, then a return is made via a step 1526.

If the polygon list of the quadtree cell Q is full, as determined by the step 1504, then this quadtree cell Q is subdivided at a step 1528 SUBDIVIDE QCELL in a manner as shown in FIG. 12, and the procedure continues to the step 1518.

Figure 16:
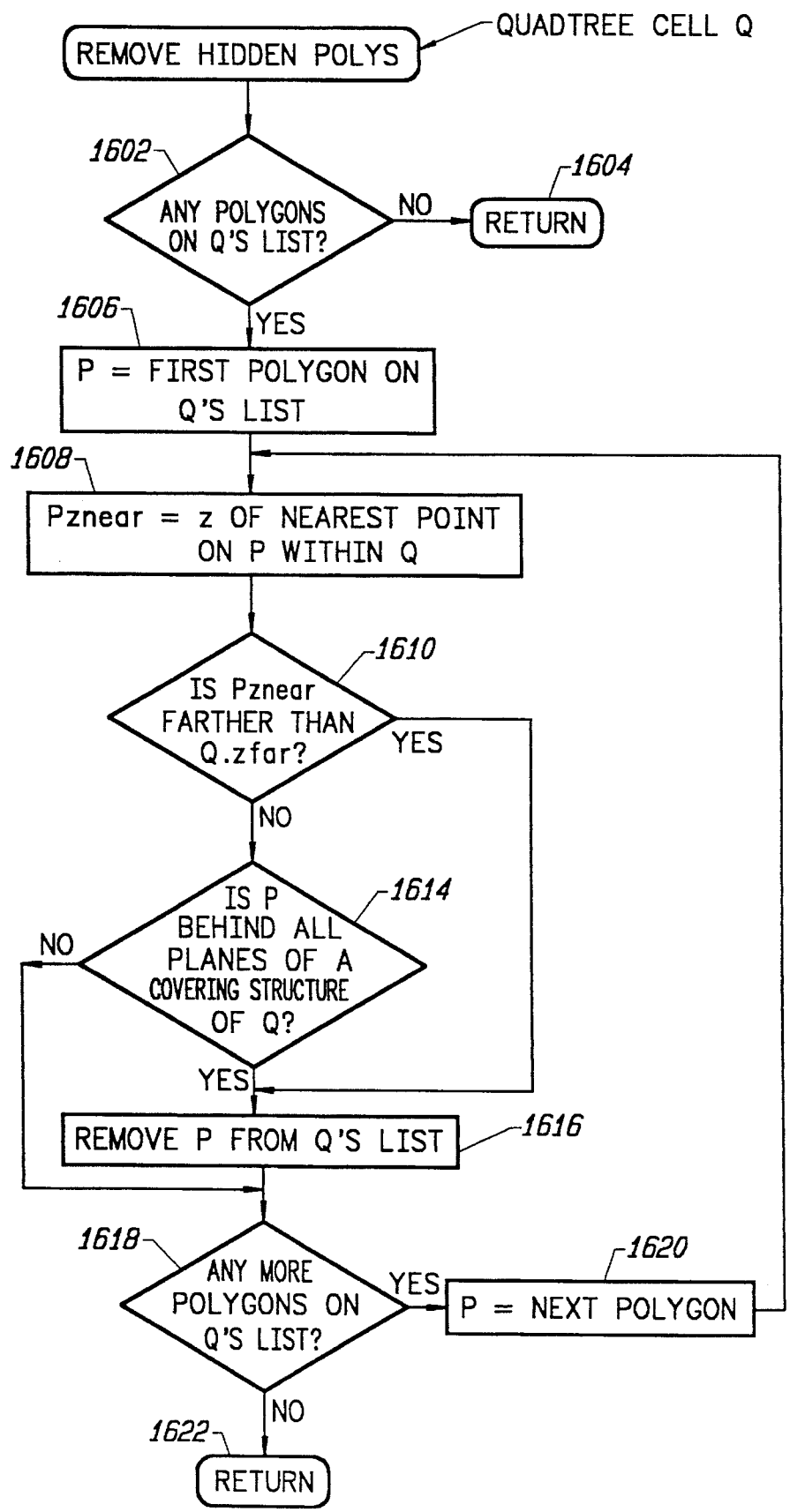

FIG. 16 shows the flow chart REMOVE HIDDEN POLYS for removing hidden polygons from a quadtree cell Q. As determined at a step 1602, if there are no polygons on the list for this quadtree cell Q, then a return is made via a step 1604. If there are, then P is set to the first polygon on the polygon list of Q at a step 1606. Then, znear of P is set equal to the z of the nearest point on the polygon P within the quadtree cell Q via a step 1608. If znear of the polygon P is not farther than zfar of the quadtree cell Q, as determined in a step 1610, and if polygon P is behind all planes of a covering structure of cell Q as determined in a step 1614, then this hidden polygon is removed from Q's list at a step 1616. If znear of the polygon P is farther than zfar of the quadtree cell Q (step 1610), then a jump is made to step 1616. If P is not behind all planes of a covering structure of Q, as determined at the step 1614, then a jump is made to a step 1618 which determines if there are any more polygons on Q's list to process. If yes, then P is set to the next polygon at a step 1620 and the procedure loops to step 1608. If not, then the procedure returns via a step 1622.

FIG. 17 illustrates the flow chart SUBDIVIDE QUADTREE TO PIXEL LEVEL for subdividing the quadtree cell Q down to the pixel level. If the quadtree cell Q is coarser than the pixel level, as determined at a step 1702, then the quadtree cell Q is subdivided at a step 1704 SUBDIVIDE QCELL as shown in FIG. 12. Next, C is set equal to the first child of the quadtree cell Q at a step 1706. Using the first child C, the quadtree is then again subdivided to the pixel level at a step 1708. If there are more children of the quadtree cell Q as determined at a step 1710, then C is set equal to the next child of Q at a step 1712 and the procedure loops to the step 1708. If there are no more children, then a return is made via a step 1714. If the original quadtree cell is not coarser than the pixel level (step 1702), then a return is made via a step 1716.

FIG. 18 illustrates the flow chart details of the refinement pass 610 REFINE of FIG. 6. Initially, all quadtree leaf cells are placed in a priority queue sorted by uncertainty at a step 1802. Then, Q is set equal to the first cell on the queue via a step 1804. Next, P is set equal to the parent of the first cell Q at a step 1806. Then, using P, the uncertainty is propagated at a step 1808. If there are more cells on the queue, as determined at a step 1810, then Q is set equal to the next cell at a step 1812 and the procedure loops to step 1806. If not, and the queue is empty pursuant to a step 1814, then a return is made at a step 1816. If not, Q is set equal to the head of queue (the quadtree cell with the greatest uncertainty) at a step 1818, and removed from the queue at a step 1820. Then, this cell Q is subdivided at a step 1822 SUBDIVIDE QCELL, and the value C is set equal to the first child of Q. Then, the uncertainty for the first child C is computed at a step 1826. Next, C is added to the queue at a step 1828. If there are more children of the quadtree cell Q, as determined at a step 1830, then C is set to the next child via a step 1832 and a return made to step 1826. Otherwise, the uncertainty is propagated at a step 1834 for the quadtree cell Q and a loop made by this procedure to step 1814.

Figure 19:
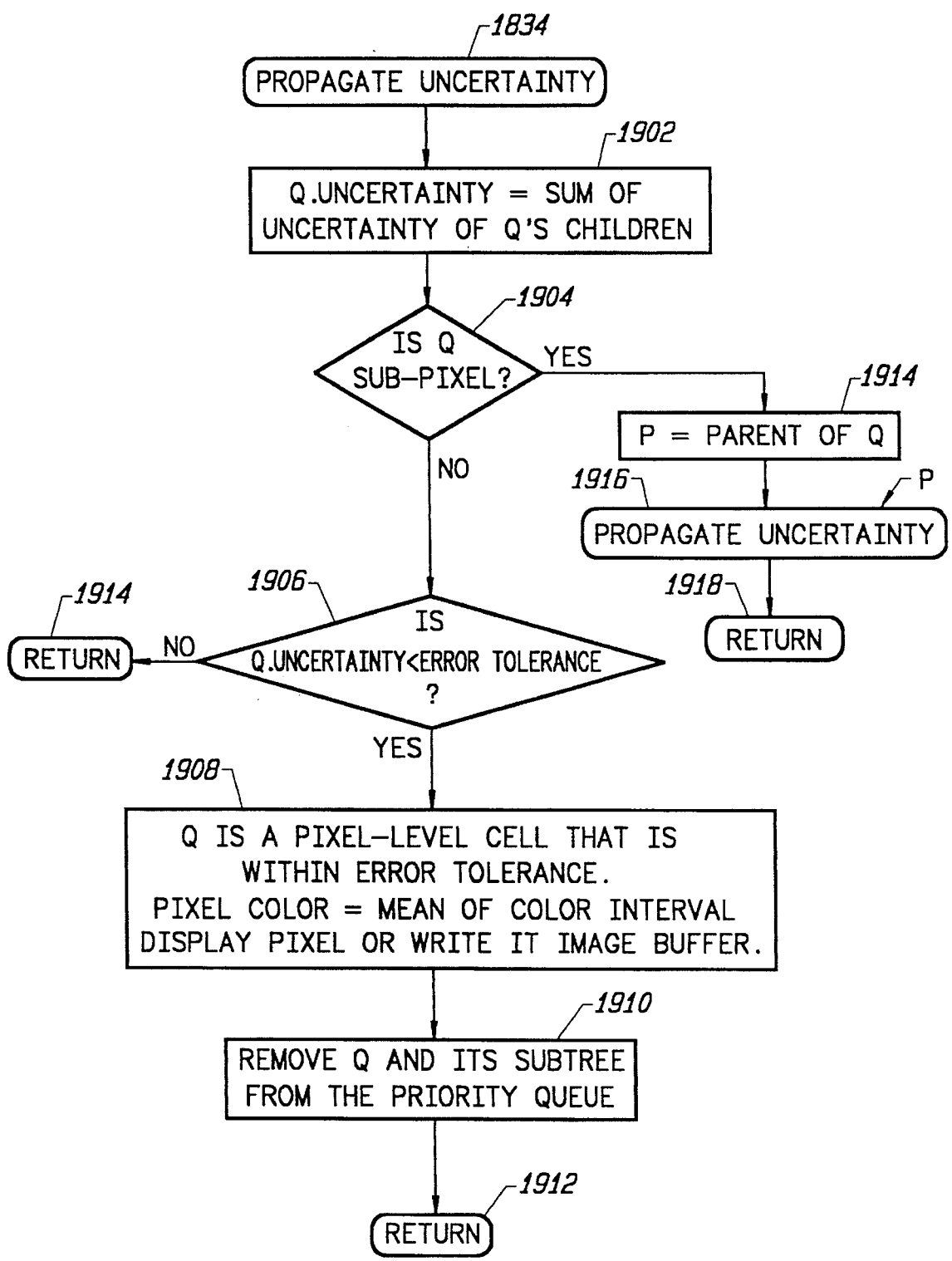

FIG. 19 shows the step 1834 PROPAGATE UNCERTAINTY for propagating the uncertainty. First, a value Q. Uncertainty is set equal to the sum of the uncertainties of all the children of the quadtree cell Q in accordance with a step 1902. Then, if this quadtree cell is not a subpixel, as determined at a step 1904, and Q. Uncertainty is less than the user specified error tolerance as determined at a step 1906, then the quadtree cell Q is determined to be a pixel level cell that is within the error tolerance as determined at a step 1908. Consequently, the pixel color for this pixel cell is set equal to the mean or average of the color interval and a display pixel is set or written to an image or frame buffer. Then, this quadtree cell Q is removed together with its subtree from the priority queue in a step 1910 and the program returns via step 1912. If the Q. Uncertainty is not less than the error tolerance (step 1906) then a return is made via a step 1914.

With respect to step 1904, if the quadtree cell Q is a subpixel, then via a branch a value P is set equal to the parent of Q at a step 1914 and the uncertainty is propagated with respect to this parent at a step 1916 PROPAGATE UNCERTAINTY followed by a return at a step 1918.

Finally, in order to compute each pixel to within the error tolerance with guaranteed accuracy, the refinement pass of the algorithm should be able to integrate $f(x, y) * I(x, y)$ analytically within a quadtree cell or prove sufficiently tight bounds on the integral. For flat shading, Gouraud shading and other polynomial shading functions, the integral can be computed analytically with simple filters. For more general shaders, however, analytic integration may not be possible, so interval arithmetic may be relied on to bound the integral. G. Alefeld and J. Herzberger, "Introduction To Interval Computations", Academic Press, 1983. J. Snyder, "Interval Analysis For Computer Graphics", Proc. Siggraph '92, pgs. 121–130, 1992. M. Kass, "CONDOR—Constraint-Based Dataflow", Proc. Siggraph '92, pgs. 321–330, July 1992. A shade-tree approach can be extended in a relatively straight-forward manner to create interval shaders. An interval shader receives bounds on input parameters such as u, y coordinates, components of the surface normal, the vector to the eye, etc. and uses these bounds to compute a bound on the output color.

Once bounds on color within a quadtree cell have been established they need to be combined with bounds on $f(x, y)$, the point spread function of the filter. For efficiency, a table of intervals can be computed for $f(x, y)$ for subdivisions of a canonical pixel down to some fine resolution. Interval multiplication can then be used to find bounds on the required convolution $f(x, y) * I(x, y)$.

Interval shaders will drive quadtree subdivision at places like specular highlights because, for this example, the bounds will be loose if a polygon could contain a highlight and much tighter otherwise. Some care may be required when constructing interval shaders for use with the algorithm. To guarantee convergence, all that is needed is that the intervals get smaller with subdivision. To achieve rapid convergence, however, the intervals must give reasonably tight bounds on the integral.

In conclusion, a practical antialiased rendering algorithm capable of rendering models of enormous complexity while producing results that are guaranteed to be correctly filtered to within a user-specified error tolerance has been disclosed.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. A computer implemented method for rendering a 3-D scene onto a display having pixels, the 3-D scene being a view of a model space which includes a plurality of surface primitives, comprising the steps of:

a) organizing the model space into a quadtree data structure having a plurality of nodes including a root node and child nodes;

b) traversing the quadtree data structure to cull nodes which are completely hidden and to insert primitives associated with any of said nodes which may be visible into an image-space quadtree data structure;

c) recursively subdividing the quadtree data structure to resolve the visibility of primitives in a given pixel and determining an output pixel value for the given pixel by applying an antialiasing filter to color components of the primitives visible in the given pixel wherein the output pixel value is determined by interval multiplication of the color components with intervals contained in a table of intervals for the filter; and d) displaying the 3-D scene on the display with hidden primitives removed therefrom and with antialiased color components of the visible primitives.

2. A computer implemented method, according to claim 1, wherein the step of recursively subdividing divides the quadtree data structure to a level where the output pixel value for the given pixel is accurate to within a specified error tolerance which is specified by bounds of a convolution integral for determining the output pixel value.

3. A computer implemented method, according to claim 1, wherein the step of traversing comprises the steps of:

a) setting a computational limit that specifies a maximum number of cube faces in a given node that are tested for visibility; and b) testing cube faces of the given node for visibility such that a number of the cube faces tested does not exceed the computational limit.

4. A computer implemented method, according to claim 3, wherein the step of testing comprises:

a) determining a number of quadtree cells being visited while testing a cube face for visibility; and b) stopping the testing if the number of quadtree cells being visited exceeds a constant times a number of polygons within each quadtree cell being visited.

5. A computer implemented method, according to claim 1, wherein the quadtree data structure contains a value zfar of a quadtree cell which is equal to the depth of the farthest visible point within the quadtree cell and a value znear of a primitive which is equal to the depth of the nearest point of the primitive within the quadtree cell.

6. A computer implemented method, according to claim 5, wherein the step of traversing comprises:

a) determining if the nearest point on a face of a node is farther than zfar of a quadtree cell; and b) determining that the face is completely hidden if the face is farther than zfar.

7. A computer implemented method, according to claim 5, wherein the step of traversing comprises:

a) determining if the nearest point on the face is nearer than znear; and b) determining that the face is at least partially visible within the cell if the face is nearer than znear.

8. A computer apparatus for rendering a 3-D scene onto a display having pixels, the 3-D scene being a view of a model space which includes a plurality of surface primitives, comprising:

means for organizing the model space into a quadtree data structure having a plurality of nodes including a root node and child nodes;

means for traversing the quadtree data structure to cull nodes which are completely hidden and to insert primitives associated with any of said nodes which may be visible into an image-space quadtree data structure;

means for recursively subdividing the quadtree data structure to resolve the visibility of primitives in a given pixel and determining an output pixel value for the given pixel by applying an antialiasing filter to color components of the primitives visible in the given pixel wherein the output pixel value is determined by interval multiplication of the color components with intervals contained in a table of intervals for the filter; and means for displaying the 3-D scene on the display with hidden primitives removed therefrom and with antialiased color components of the visible primitives.

9. The computer apparatus of claim 8, wherein the means for recursively subdividing divides the quadtree data structure to a level where the output pixel value for the given pixel is accurate to within a specified error tolerance which is specified by bounds of a convolution integral for determining the output pixel value.

10. The computer apparatus of claim 8, wherein the means for traversing comprises:

means for setting a computational limit that specifies a maximum number of cube faces in a given node that are tested for visibility; and means for testing cube faces of the given node for visibility such that a number of the cube faces tested does not exceed the computational limit.

11. The computer apparatus of claim 10, wherein the means for testing comprises:

means for determining a number of quadtree cells being visited while testing a cube face for visibility; and means for stopping the testing if the number of quadtree cells being visited exceeds a constant times a number of polygons within each quadtree cell being visited.

12. The computer apparatus of claim 8, wherein the quadtree data structure contains a value zfar of a quadtree cell which is equal to the depth of the farthest visible point within the quadtree cell and a value znear of a primitive which is equal to the depth of the nearest point of the primitive within the quadtree cell.

13. The computer apparatus claim 12, wherein the means for traversing comprises:

means for determining if the nearest point on a face of a node is farther than zfar of a quadtree cell; and means for determining that the face is completely hidden if the face is farther than zfar.

14. The computer apparatus of claim 12, wherein the means for traversing comprises:

means for determining if the nearest point on the face is nearer than znear; and means for determining that the face is at least partially visible within the cell if the face is nearer than znear.

* * * * *